Oct. 27, 1942.  R. RAYMOND  2,300,316
PRIVATE BRANCH EXCHANGE SYSTEM
Filed Aug. 3, 1940  12 Sheets-Sheet 2

INVENTOR
R. RAYMOND DECEASED
PHYLLIS RAYMOND
HIS ADMINISTRATIX
BY  P. C. Smith
ATTORNEY Oct. 27, 1942.   R. RAYMOND   2,300,316
PRIVATE BRANCH EXCHANGE SYSTEM
Filed Aug. 3, 1940   12 Sheets-Sheet 5

INVENTOR
R. RAYMOND DECEASED
PHYLLIS RAYMOND
HIS ADMINISTRATRIX
BY P. C. Smith
ATTORNEY

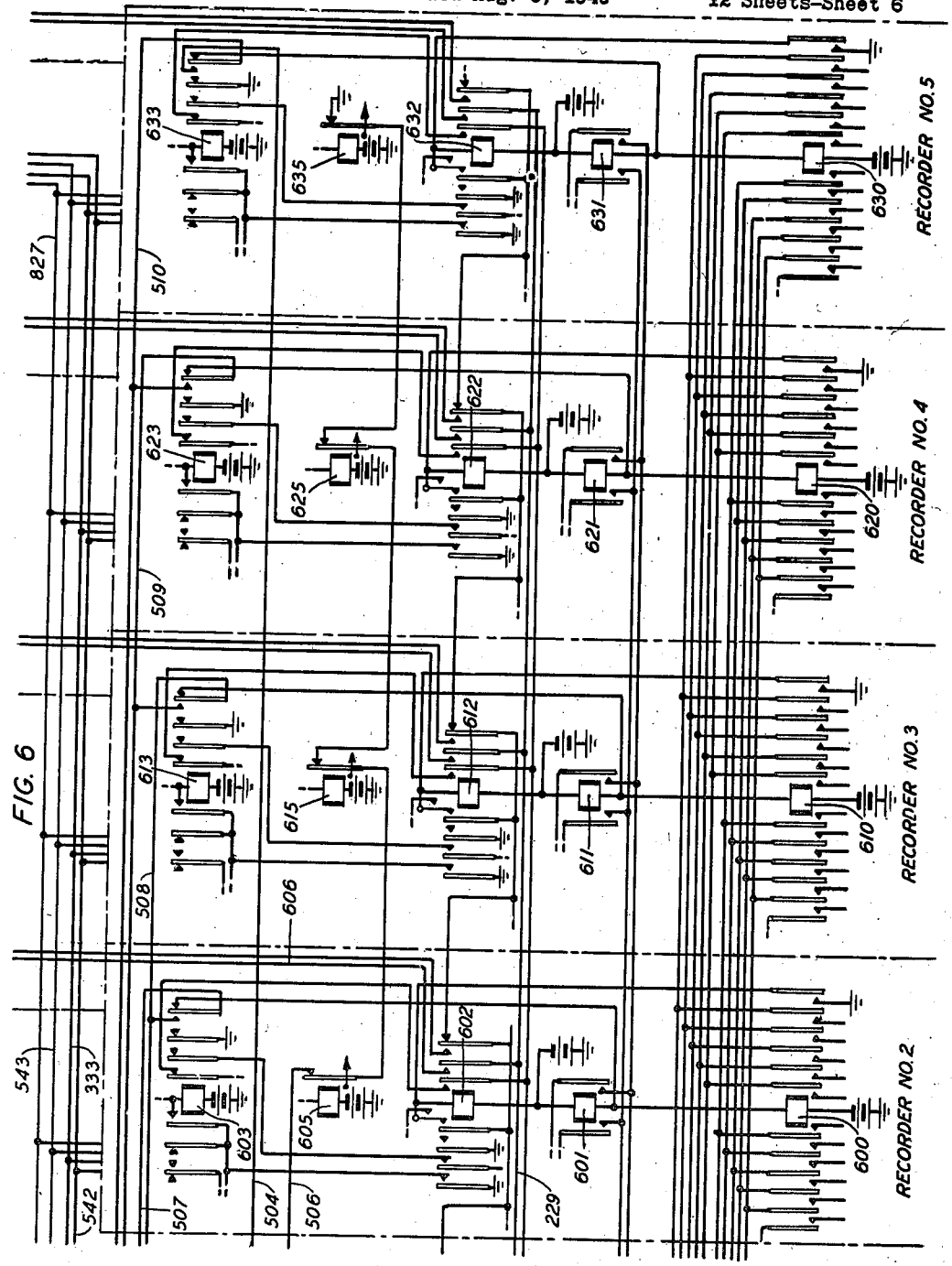

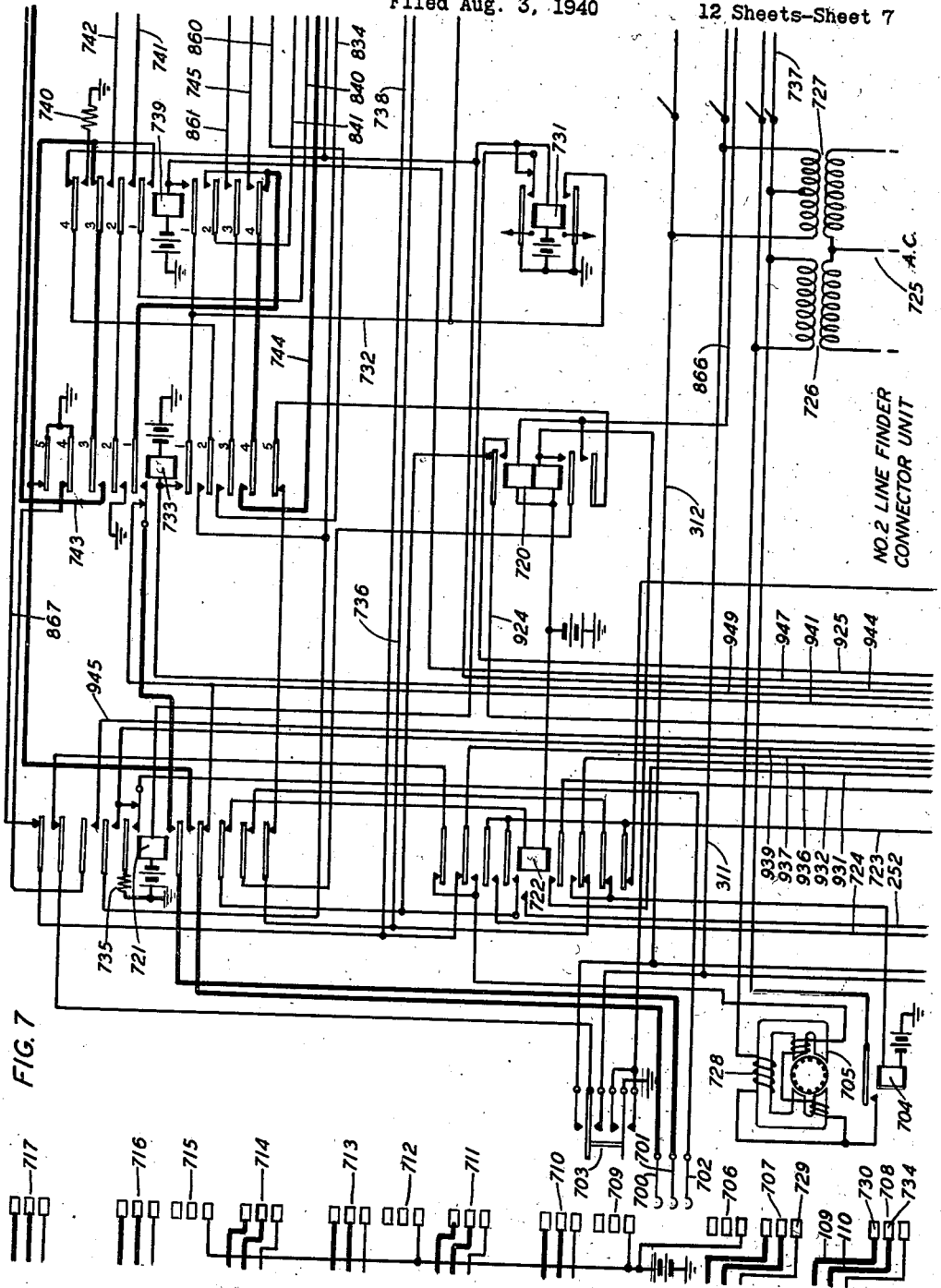

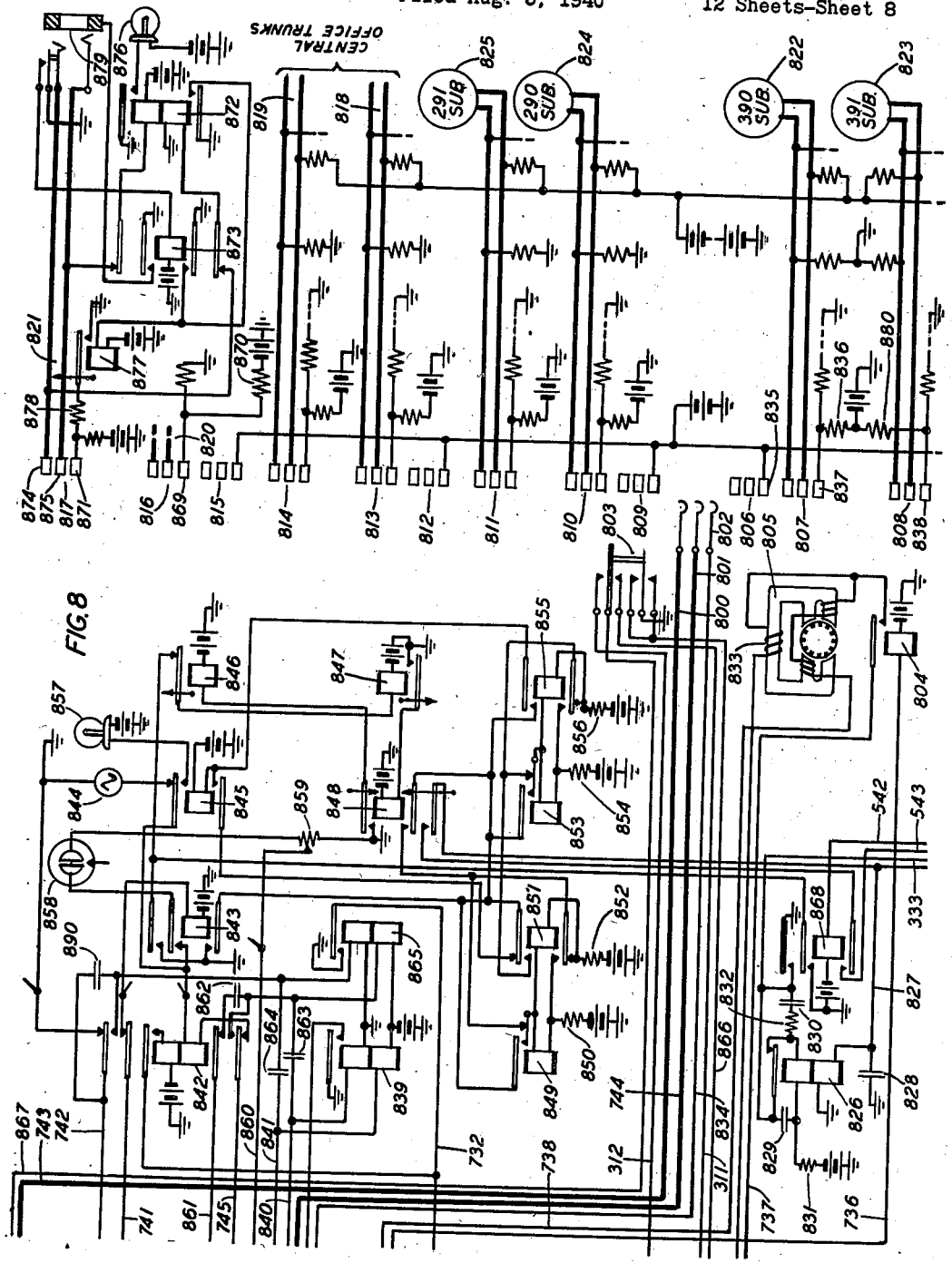

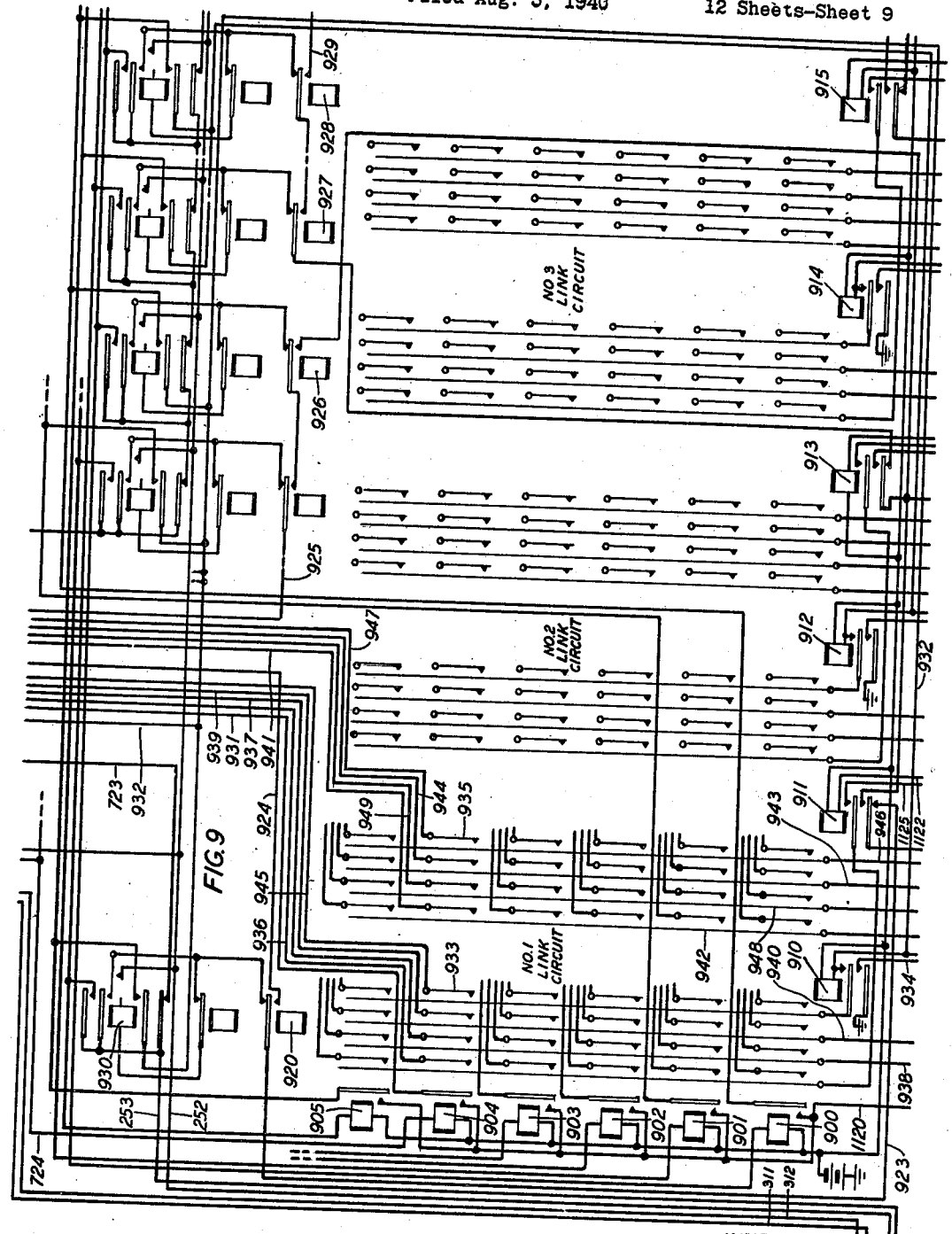

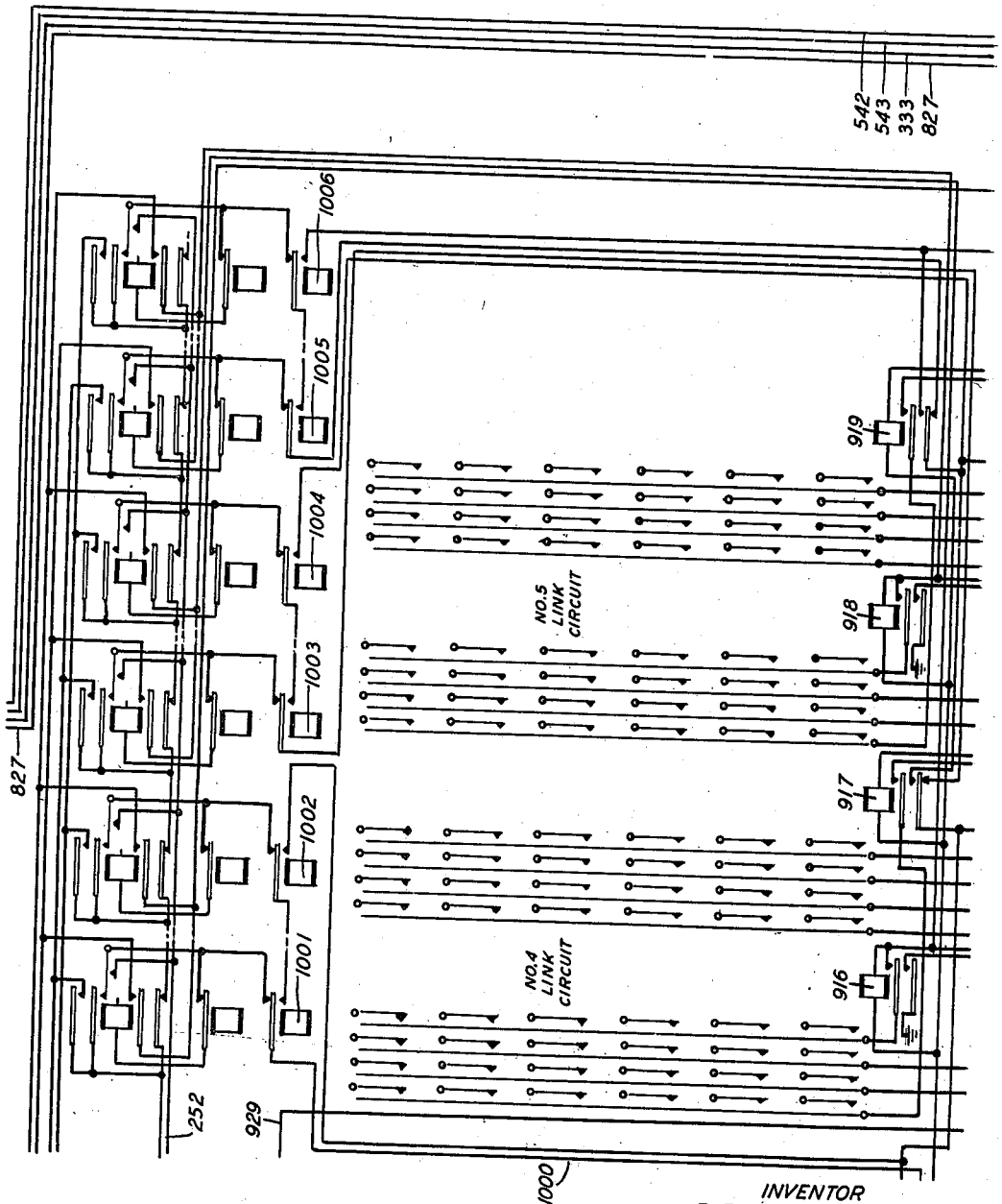

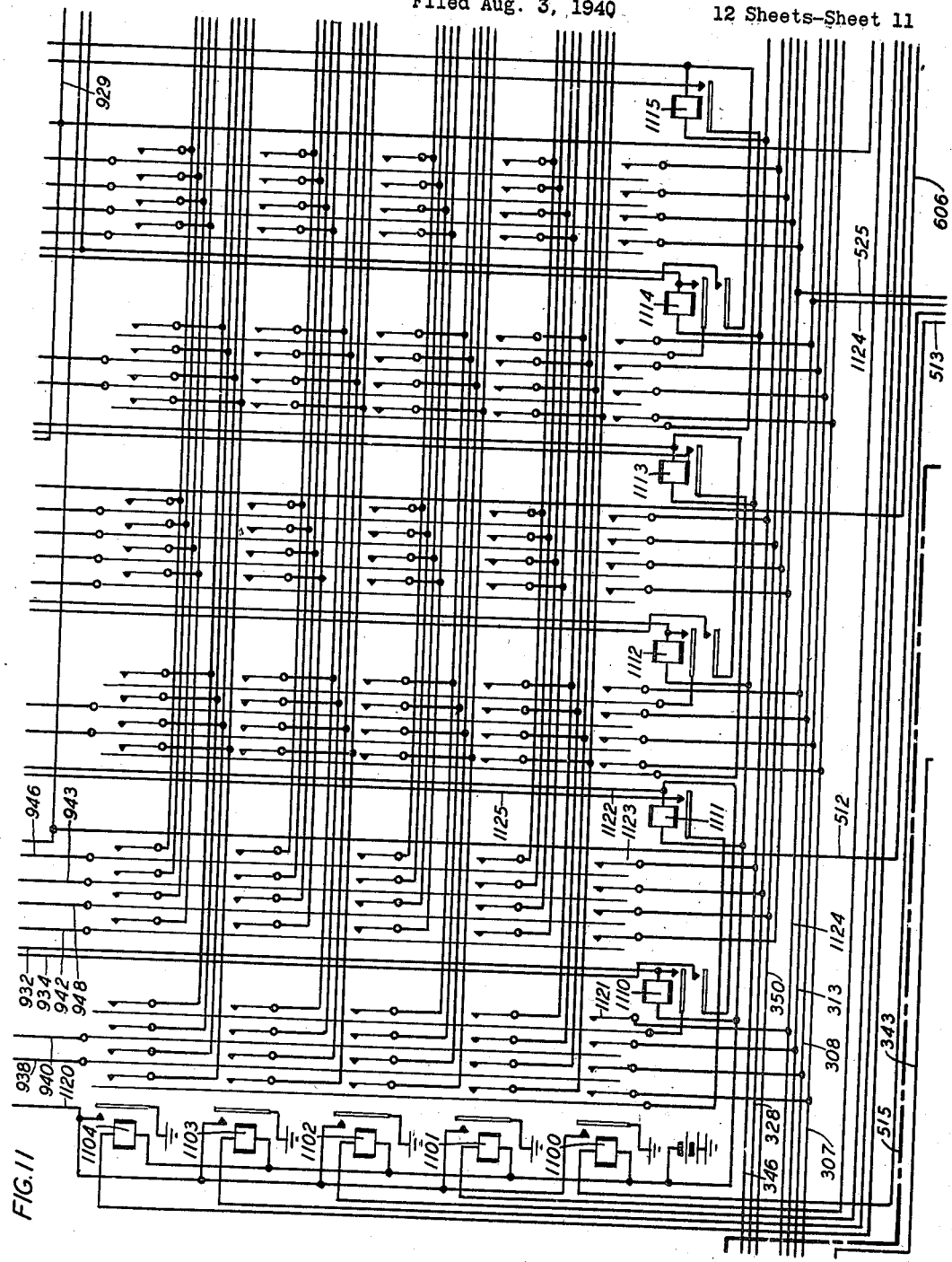

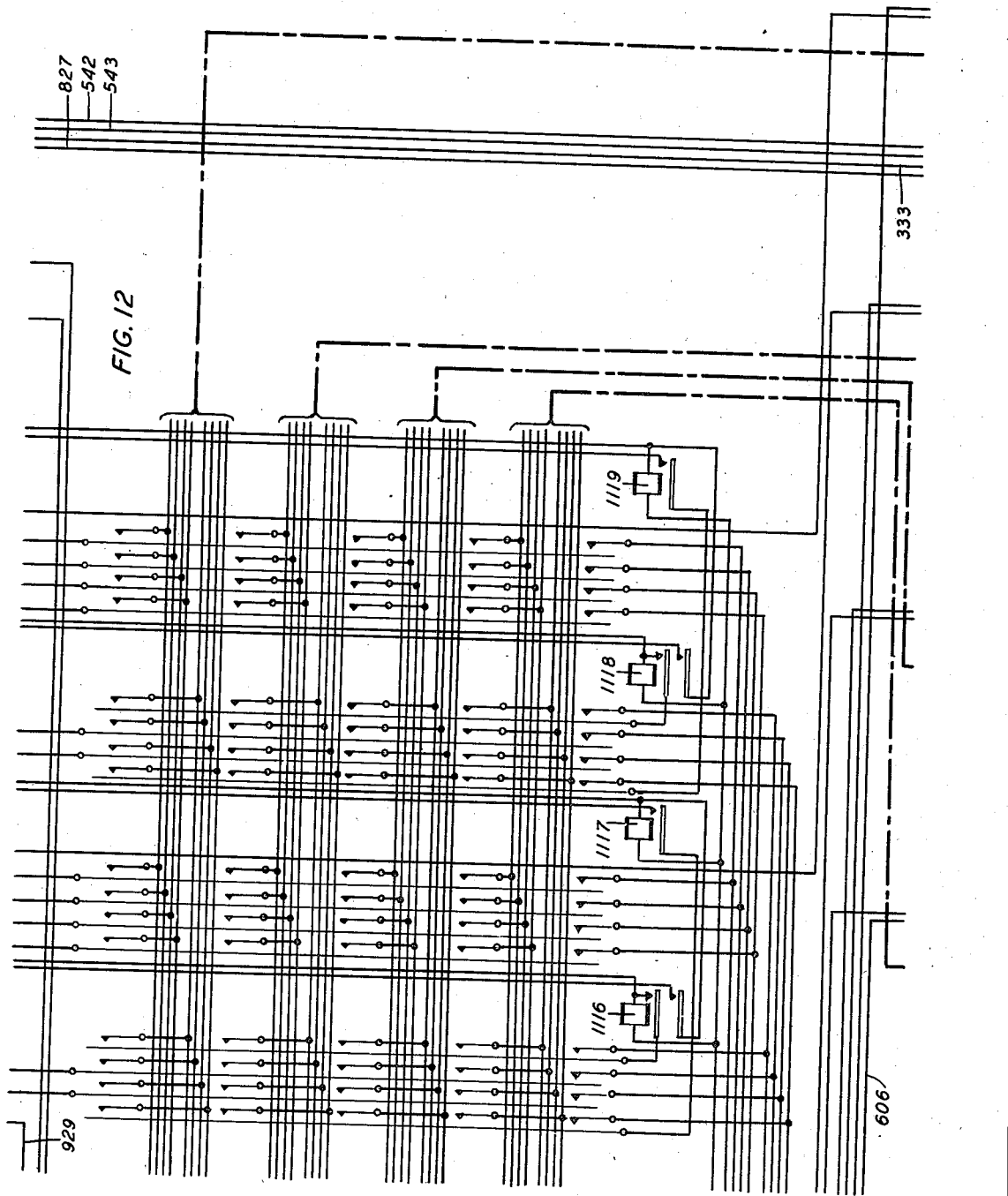

Patented Oct. 27, 1942

2,300,316

UNITED STATES PATENT OFFICE 2,300,316

PRIVATE BRANCH EXCHANGE SYSTEM

Ralph Raymond, deceased, late of Nyack, N. Y., by Phyllis Raymond, administratrix, Brooklyn, N. Y., assignor to Bell Telephone Laboratories, Incorporated, New York, N. Y., a corporation of New York Application August 3, 1940, Serial No. 350,964

16 Claims. (Cl. 179—18)

This invention relates to telephone exchange systems and more particularly to private branch exchange systems in which high speed switches are employed as line finders and connectors for establishing connections between subscribers' lines.

It is the object of the present invention to provide a private branch exchange system in which calls may be completed under dial control at high speeds and in a simple and economical manner.

One feature of the invention is the provision of a chain of gas-filled tubes to control the group selection movement of a line finder or connector by initially firing one of the tubes in accordance with the calling line-group identification or the dialed called line-group identification and then firing the succeeding tubes in the chain to control the degree of group hunting movement of the line finder or connector.

Another feature of the invention is the provision of a second chain of gas-filled tubes to control the registration of one dialed digit of a called line number and in the subsequent use of the same chain of tubes to register another digit and to control the operation of a connector switch in its terminal selection movement.

A further feature of the invention is the use of high speed tape driven switches of the type disclosed in Patent No. 2,123,229, granted July 12, 1938, to W. W. Carpenter and R. F. Mallina, as line finder and as connector switches and controlling the step-by-step movements of such switches to select calling or called line terminals.

In accordance with the present invention, the private branch exchange system has a capacity of two hundred station lines, a group of trunks extending to an attendant's position, a group of trunks extending to a central office and two groups of tie-line trunks extending to other private branch exchanges, accommodation being had for other tie-line trunk groups if desired. For establishing connections thirty switch units are employed, each unit comprising a line finder and a connector of the high speed tape driven type disclosed in Patent 2,123,229 to Carpenter et al., above referred to, the line finders preferably having access to line and trunk terminals on one face of the panel bank and the connectors to the line and trunk terminals on the other face of the bank although by extending the bank lengthwise the line finders and connectors could be located on the same side of the bank. To accommodate the station lines and trunk groups, three banks are employed, one of one hundred and ten terminal sets located below the normal wiper positions of the switches in which one hundred station lines divided into ten subgroups terminate with a group terminal set preceding each subgroup, a second bank of one hundred and ten terminal sets located immediately above the normal wiper positions in which a second one hundred station lines similarly subgrouped terminate and a third bank positioned immediately above the second bank in which groups of trunks terminate, each group of trunk terminals being likewise preceded by a group terminal. The wipers of each switch may be driven from their normal position either downwardly or upwardly to connect with the terminals of any station line or trunk.

For each ten station lines or incoming trunks, a multi-electrode gas-filled tube is employed, the ten control electrodes of which are connected to tip conductors of ten lines, the tip conductor of each line being also connected to ground through a resistance and the ring conductor of each line being connected through a resistance to the positive terminal of a 90-volt battery whose negative terminal is grounded. Thus when a calling loop is established on any one of the ten lines or trunks, positive potential is applied to a control cathode of the common tube thereby firing the tube to operate a group relay common to the line or trunk group. The group relay is instrumental in seizing one of five common recorder circuits in a specified preference, a different preference being allocated to the group relays of which twenty-two are provided. If any preferred recorder is found busy, at the time a call is incoming, the next idle recorder in the order of preference is seized.

When an idle recorder is seized it is connected to an idle line-finder-connector unit over one of five links by a recorder link cross-bar switch and by a line-finder link cross-bar switch, each recorder having a different preference of link and each link having a choice of six of the line-finder-connector units. The vertical units of the switches are operated in pairs to afford the required number of eight conductors for each link. The recorder link switches have five common select magnets, one for each recorder; the line-finder link switches have six common select magnets, one for each group of five line-finder-connector units and each switch has ten hold magnets, the hold magnets of two adjacent and corresponding vertical units of the recorder link switch and of the line-finder link switch being operable together.

On the seizure of any recorder, it becomes connected over the first idle link in the order of preference to an idle line-finder-connector unit and the wiper carriage of the selected line finder is started at high speed either up or down in accordance with the location of the calling line group in the bank as determined by the operated line group relay. For controlling the extent of movement of the wiper carriage to reach the calling line group, a first chain of fifteen three-element cold cathode tubes is employed, the tubes of the chain being so associated that each tube upon being fired primes the next tube and that tube upon firing primes the next succeeding tube and extinguishes the preceding tube. Each line-group relay upon operating fires one of the tubes of the chain in accordance with the position of the corresponding line group in one of the line-finder banks and the passage of the sleeve wiper of the line finder over sleeve terminals of the group terminal sets, causes the firing of successive tubes of the chain following the tube fired by the operated group relay until, upon the firing of the fifteenth tube of the chain, the driving circuit of the line finder is opened to arrest the group hunting movement at which time the wipers of the line finder will have been advanced to the group terminal set of the calling line group. Due to the high hunting speed of the line finder, the wipers will overrun the group terminal set of the calling line group whereupon the driving motor will be reversed to drive the wipers at a lower speed back to the calling line group terminal set whereupon the fifth tube of the chain, which was primed by the firing of the fifteenth tube, is fired and causes the extinguishing of the fifteenth tube which is now effective to arrest the return movement of the linefinder wipers upon the group terminal set of the calling line group.

The switch is then started in its original direction of movement at a low speed to hunt for the calling line in the selected line group, its sleeve wiper in passing over each line sleeve terminal regardless of the idle or busy condition of the line, causing the momentary extinguishing of a gas-filled tube which was ionized upon the seizure of the recorder to control a relay combination to momentarily stop the advance of the switch wipers and to successively fire tubes of the chain succeeding the previously fired fifth tube. The switch wipers are then advanced step by step over the terminal sets of the calling line group until the terminals of the calling line are encountered, whereupon positive 90-volt battery connected from the ring conductor of the calling line over the station loop to the tip terminal of the line is instrumental in firing a further gas-filled tube of the recorder to prevent the further advance of the wipers of the line finder. At this time the operated line-group relay is released, the dialing loop from the calling line is extended to the recorder over which dial tone is transmitted, the recorder is prepared to register the first digit of the desired station line or trunk number and the control circuits for the connector tied with the seized line finder are prepared.

In response to the dialing of the first digit, successive cold cathode tubes of a second chain are fired in accordance with the number of digit impulses received to register the first or hundreds digit, the tube last fired being instrumental following the termination of the digit series to operate one of six hundreds register relays dependent upon whether the first digit dialed was 2, 3, 7, 8, 9 or 0. If digit 1, 4 or 6 is dialed in error or there was a preliminary impulse, the tube of the second chain last fired, is extinguished and the circuit returns to the condition which existed before the digit was dialed. If hundreds relay 7, 8, 9 or 0 is operated, indicating a desired trunk group, the recorder is at once prepared for trunk hunting since no further digits are expected, but if digit 2 or 3 is dialed indicating a station call, relays are operated to transfer dialing control from the second chain of tubes to the fourth tube of the first chain which immediately fires, whereupon such tubes of the first chain beginning with the fifth and extending to the fourteenth are successively fired depending upon the digital value of the second digit dialed. At the termination of the second digit series, the last tube of the second chain fired, is extinguished, the first tube of the second chain is fired and the dialing control is transferred from the first chain of tubes to the second chain of tubes. In response to the third digit dialed, tubes of the second chain are successively fired in accordance with the digital value of the third digit. The tens or subgroup digit is now registered by the fired condition of one of the tubes of the first chain and the units digit by the fired condition of one of the tubes of the second chain.

As soon as the second digit has been registered, the motor of the connector switch is operated in the direction determined by the value of the first digit registered by the hundreds relay which was operated, that is, to make a selection in the lower bank or in one of the upper banks and drives the connector wipers at high speed. As the wipers advance, the sleeve wiper engages successive group terminal sleeves and thereby causes the firing of the successive tubes of the first chain beginning with the tube succeeding the one last fired to register the tens digit until the sleeve wiper causes the firing of the fifteenth tube of that chain at which time the wipers will have advanced to the group terminal set of the registered line group of ten lines. Due to the high hunting speed, the wipers will overrun the group terminal set whereupon the motor will be reversed to drive the wipers at a lower speed back to the group terminal set of the wanted group, whereupon the fifth tube of the first chain which was primed by the firing of the fifteenth tube is fired and extinguishes the fifteenth tube which is now effective to arrest the return movement of the wipers on the group terminal set of the registered line group.

The connector switch is then started in its original direction of movement and advances one step in the manner previously described in connection with the step-by-step movement of the line finder and stops on the terminals of the first trunk of the group if a trunk call has been dialed or on the terminals of the first line of the selected subgroup if the units digit has not been registered. As soon as the units digit for a station line call has been registered, the connector continues to advance step by step, each step being counted by the firing of successive tubes of the second group beginning with the tube succeeding the tube last fired to register the units digit, the called line terminal being reached at the time the last or twelfth tube of the second chain is fired. When this tube fires the advance motion of the switch is arrested and the idle or busy condition of the line is then tested and if found busy, a busy tone is transmitted, but if found idle a talking selection relay is operated in the switch unit to start ringing, cut-through of the connection and the release of the recorder.

If the called line is the first of a hunting group or if the first trunk of a trunk group is busy, the connector is advanced step by step until an idle line or trunk is found.

For a clearer understanding of the invention, reference may be had to the following detailed description taken in connection with the accompanying drawings, in which.

Figure 3:
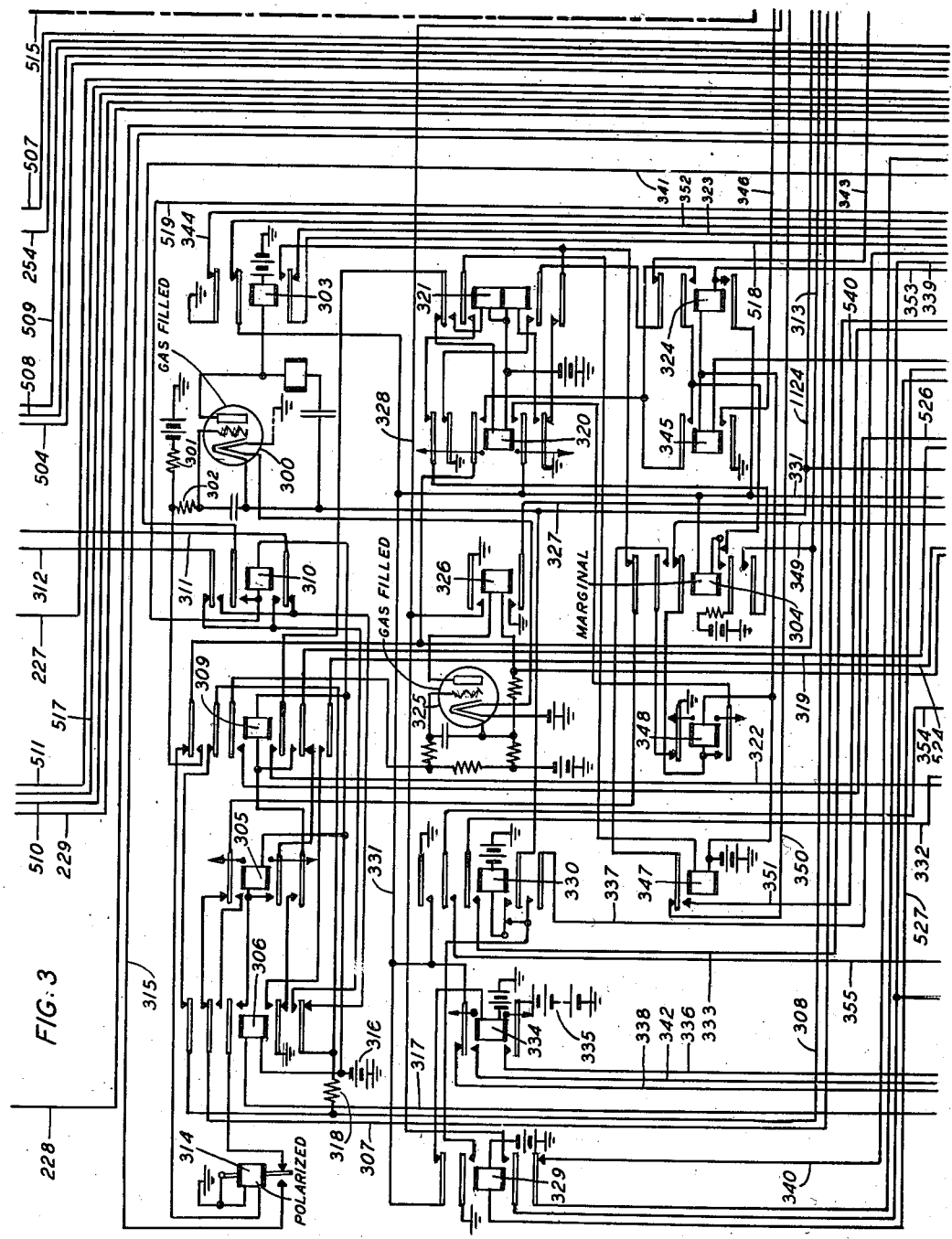
Figure 4:
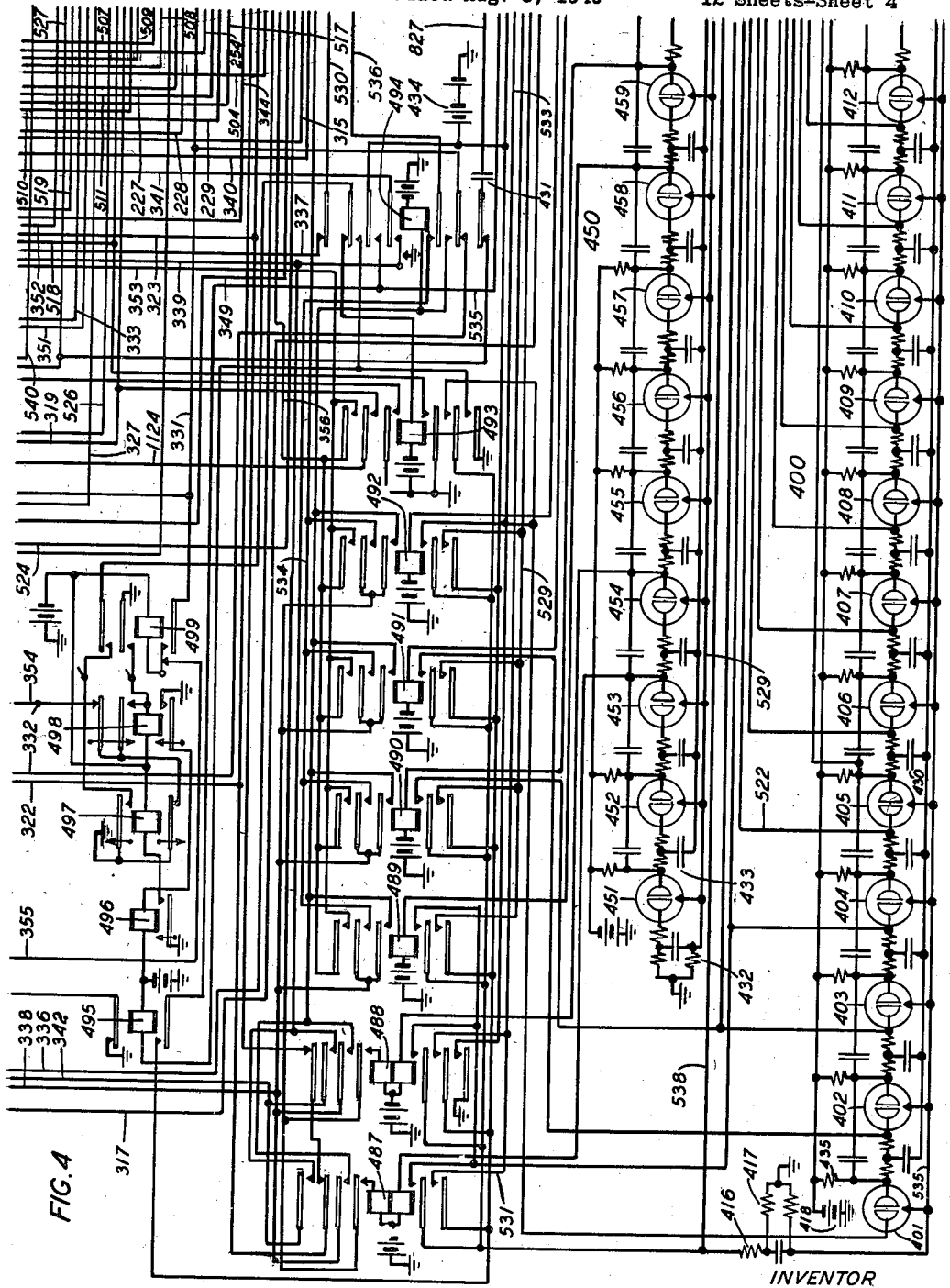
Figure 5:
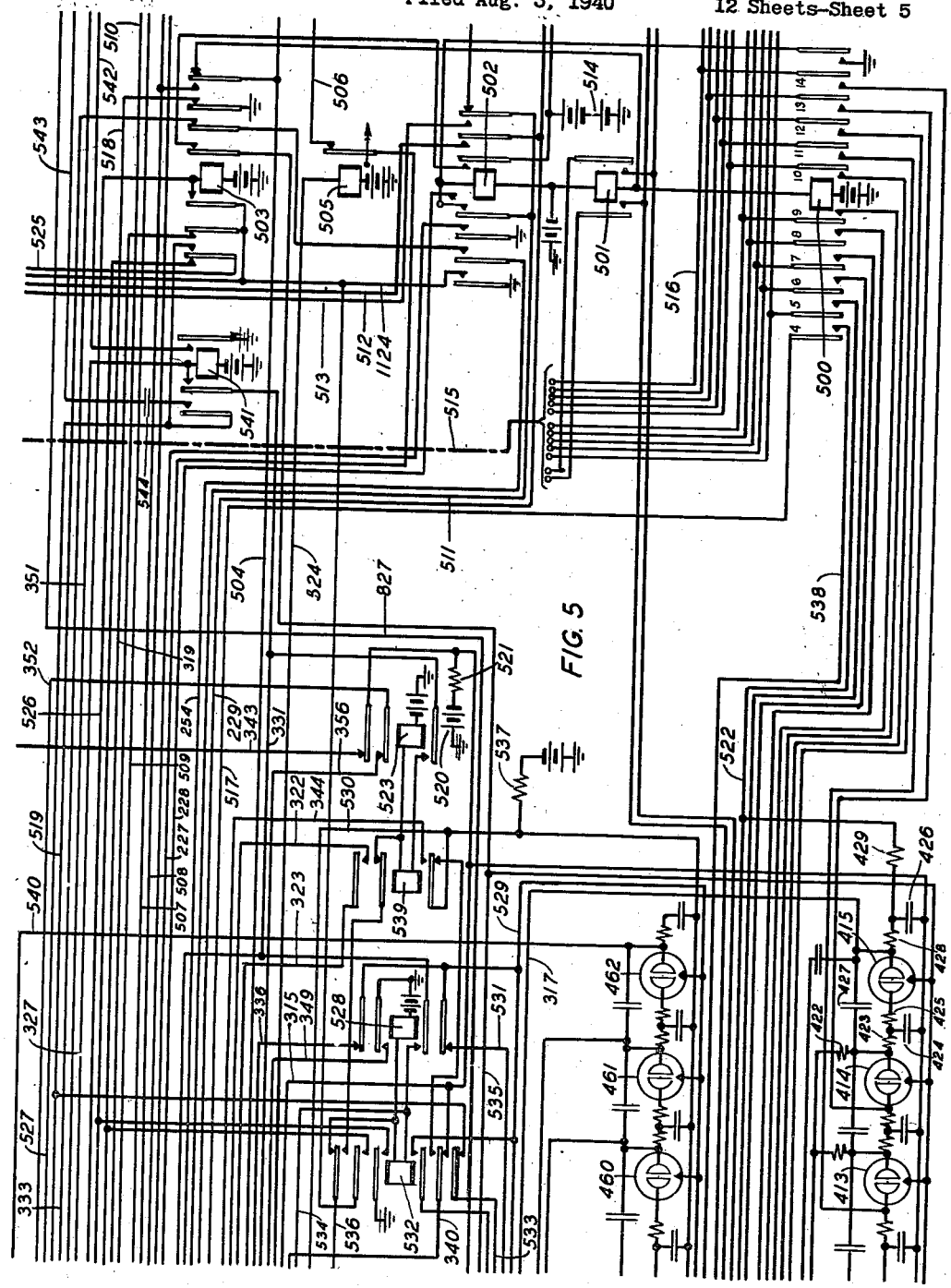

Figs. 3 to 5, inclusive, taken together, show one complete recorder or sender circuit;

Fig. 6 shows portions of four other recorder circuits;

Figs. 7 and 8 taken together show a line-finder-connector unit, Fig. 7 showing the line finder and Fig. 8 showing the connector and certain station lines and trunks to which the connector has access;

Figs. 9 to 12, inclusive, disclose five links and associated switches, whereby any one of the five recorders may become associated with any one of thirty line-finder-connector units, Figs. 9 and 10 showing the line-finder link switch and Figs. 11 and 12 showing the recorder link switch; and Fig. 13 is a chart showing how Figs. 1 to 12, inclusive, should be arranged to completely disclose the invention.

GENERAL DESCRIPTION

As previously stated the circuits disclosed to illustrate the invention have been designed to serve two hundred station lines, two groups of two-way tie-line trunks extending to other private branch exchanges, a group of trunks extending to a central office, and a group of trunks extending to an attendant's position. For establishing connections between station lines or between station lines or trunks and tie-line trunks, thirty line-finder-connector switch units are provided, each unit comprising a line finder and a connector of the high speed tape driven panel type disclosed in Patent 2,123,229 hereinbefore referred to. Each switch is provided with a set of three wipers, a reversing switch, a brake magnet and a reversible alternating current driving motor. One of the units disclosed in Figs. 7 and 8 comprises a line finder having a wiper set including tip, ring and sleeve wipers 700, 701 and 702, respectively, a reversing switch 703, a brake magnet 704 and a driving motor 705 and a connector switch having a wiper set comprising tip, ring and sleeve wipers 800, 801 and 802, respectively, a reversing switch 803, a brake magnet 804 and a driving motor 805.

Three double faced banks of terminal sets are provided common to all line finders and connectors, the line finders having access to the terminal sets on one face of the banks and the connectors to the terminal sets on the other face of the banks. The wiper sets of the line finder and connector disclosed in Figs. 7 and 8 have been illustrated in their normal positions just above the bottom one of the three banks and just below the middle bank. Station lines whose directory numbers are 300 to 399 are divided into subgroups of ten lines each and terminate in subgroups of terminal sets of the lower bank, each subgroup of ten terminal sets being preceded by a group terminal set. As illustrated, the upper terminal set 706 of the lower bank is a group terminal set allocated to the first group of ten station line terminal sets in which lines having the directory numbers 300, 309, 308-301 terminate in the order stated. Line 101, having a directory number 300, terminates in the first terminal set 707 of this subgroup and line 100 having a directory number 301 terminates in the tenth terminal set 708 of this subgroup. The terminal set 708 is followed by another group terminal set (not shown) in Fig. 7, but disclosed for convenience of illustration at 806 in Fig. 8, and then followed by another subgroup of ten terminal sets allocated to lines having the directory numbers 390 to 399, the first line 822 of this subgroup whose directory number is 390 appearing in terminal set 807 and the tenth line 823 of this subgroup whose directory number is 391 appearing in terminal set 808. In a similar manner, eight other group terminal sets and associated subgroups of line terminal sets follow in the bank, the last subgroup of ten terminal sets being allocated to lines whose directory numbers are 310, 319, 318-311 in the order named.

Station lines whose directory numbers are 200 to 299 are similarly divided into subgroups of ten lines each and terminate in subgroups of terminal sets of the middle bank, that is, the bank immediately above the normal wiper positions of the switches, each subgroup of ten terminal sets being preceded by a group terminal set. As illustrated, the lower terminal set 709 is a group terminal set allocated to the first group of ten station line terminal sets in which lines having the directory numbers 200, 209, 208-201 terminate in the order stated. Line 102 having a directory number 200 terminates in the first terminal set 710 of this subgroup and line 103 having a directory number 201 terminates in the tenth terminal set 711 of this subgroup. The terminal set 711 is followed by another group terminal set (not shown) in Fig. 7, but disclosed for convenience of illustration at 809 of Fig. 8 and then followed by another subgroup of ten terminal sets allocated to lines having the directory numbers 290 to 299. The first line 824 of this subgroup whose directory number is 290 appears in terminal set 810 and the tenth line 825 of this subgroup whose directory number is 291 appears in terminal set 811. Seven other subgroups of terminal sets (not shown) each preceded by a group terminal set follow the terminal set 811 in the bank. The last group terminal set 712 allocated to the tenth subgroup of ten station line terminal sets, allocated to lines having the directory numbers 210 to 219 follows the last terminal set of the ninth subgroup (not shown) in turn followed by the tenth subgroup of ten station line terminal sets. Line 104 having a directory number 210 terminates in the first terminal set 713 of this subgroup and line 105 having a directory number 211 terminates in the tenth terminal set 714 of this subgroup that is in the uppermost terminal set of the bank.

Tie-line trunks, trunks to a central office and trunks to an attendant's position terminate in terminal sets of the uppermost bank. The first terminal set 715 of this bank is a group terminal set allocated to a first group of two-way tie-line trunks. This group may contain any required number of trunks but will be assumed to have ten trunks, the first of which 106 terminates in terminal set 716 and the tenth of which terminates in terminal set 717. An idle one of these tie-line trunks may be reached by a connector switch in response to the dialing of a single digit 7. A second group of terminal sets preceded by a group terminal set follows the terminal set 717 in the terminal bank and is allocated to a second group of tie-line trunks which also may contain ten or more trunks, an idle one of which may be reached by a connector switch in response to the dialing of the single digit 8. Immediately succeeding the second group of tie-line trunk terminal sets is a group of terminal sets, not shown in Fig. 7 but disclosed in Fig. 8, preceded by a group terminal set 812 and allocated to a group of trunks extending to a central office. The first of these trunks 818 terminates in terminal set 813 and the last of these trunks 819 terminates in terminal set 814. An idle one of these trunks may be seized by a connector switch in response to the dialing of a single digit 9. These trunks, however, are arranged to handle only calls toward the central office and are not provided with equipment for controlling a line finder to hunt for their terminals. Immediately above this group of central office trunk terminal sets is a group of terminal sets not shown in Fig. 7 but disclosed in Fig. 8 preceded by a group terminal set 815 and allocated to a group of trunks extending to an attendant's position. The first of these trunks 820 terminates in terminal set 816 and the last 821 terminates in terminal set 817. An idle one of these trunks may be seized by a connector switch in response to the dialing of a single digit 0, but these trunks being arranged to handle only calls towards the attendant's position are not provided with equipment for controlling a line finder to hunt for their terminals.

From the foregoing discussion of the subgrouping of the station lines and trunks, it will be noted that the station lines are divided into twenty ten-line subgroups and that there are two subgroups of tie-line trunks over which calls may be initiated. Twenty-two multielectrode cold cathode tubes 200 to 221, inclusive, are therefore provided individual respectively to these subgroups of lines and tie-line trunks which serve as common line relays for the lines and trunks. Each of these tubes is provided with a cathode, an anode and ten control cathodes or grids and may be of the general type disclosed in Patent No. 2,039,637, granted May 5, 1936, to T. L. Dimond. In order to simplify the drawing only eight of these tubes and their associated line-group or anode relays have been disclosed, tubes 220 and 221 being individual respectively to the two subgroups of tie-line trunks, tubes 210 and 219 being individual respectively to the station line subgroups including lines 102 to 103 and 104 to 105, tube 214 being individual to an intermediate station line subgroup (not shown) terminating in the middle bank, tube 200 being individual to the station line subgroup including lines 101 to 100, tube 204 being individual to an intermediate station line subgroup (not shown) terminating in the lower bank and tube 209 being individual to the last station line subgroup (not shown) terminating in the lower bank.

The control cathodes or grids of these tubes are connected through high resistances to the tip conductors of station lines or trunks, the cathodes of the tubes are connected to the negative terminal of battery 222, the positive terminal of which is grounded and the anodes of the several tubes are connected through the windings of their associated anode or line-group relays over chain contacts of the line-group relays to the positive terminal of a 90-volt battery 223, the negative terminal of which is connected to ground. For example the anode of tube 221 is connected through the winding of relay 251 to battery 223; the anode of tube 220 is connected through the winding of relay 250 and the back contact of relay 251 to battery 223; the anode of tube 219 is connected through the winding of relay 249 and back contacts of relays 250 and 251 to battery 223, etc. The contacts of the line-group relays are connected in chain circuits beginning with relay 230, extending through relays 231, 232 and 233 (not shown) relay 234, relays 235, 236, 237 and 238 (not shown), relays 239 and 240, relays 241, 242 and 243 (not shown), relay 244, relays 245, 246, 247 and 248 (not shown) and thence through relays 249, 250 and 251.

Two chains of three-element cold cathode tubes are provided in each recorder of which the No. 1 recorder is disclosed in full in Figs. 3 to 5, inclusive. The chain 400 comprises fifteen tubes 401 to 415, inclusive, disclosed in Figs. 4 and 5 which are connected in such a manner that one tube upon firing or becoming conducting primes the next succeeding tube and extinguishes the preceding tube. The chain 450 comprises twelve tubes 451 to 462, inclusive, similarly connected.

The cross-bar switches disclosed in Figs. 9 to 12, inclusive, may be of the well-known type disclosed in Patent 2,021,329, granted November 19, 1935, to J. N. Reynolds. The line-finder link switch disclosed in Figs. 9 and 10 has six select magnets 900 to 905, inclusive, and ten hold magnets 910 to 919, inclusive, some of which are disclosed in Fig. 10 and the recorder link switch disclosed in Figs. 11 and 12 has five select magnets 1100 to 1104, inclusive, and ten hold magnets 1110 to 1119, inclusive, some of which are disclosed in Fig. 12. The corresponding hold magnets of both switches are operable together and upon operating cause the operation of the corresponding adjacent hold magnets of both switches. For example, hold magnets 910 and 1110 operate in parallel and upon operating cause the operation of the adjacent hold magnets 911 and 1111.

Initiation of a station call

It will now be assumed that the subscriber whose line is indicated at 100 initiates a call and dials the directory number 391 of the line 823. Upon removing the receiver from the switchhook a circuit is established from ground through resistance 108 of approximately 5,000 ohms, over tip conductor 109 through the substation, thence over ring conductor 110, through resistance 111 of approximately 5,000 ohms, to the positive terminal of 90-volt battery 112, the negative terminal of which is grounded. Positive potential is also applied from the battery 112 through resistance 111 over the line loop through high resistances 113 and 114 in series and conductor 115 to the grid of tube 200 which is allocated to the lines of the subgroup in which line 100 is located. Tube 200 now becomes conducting over its cathode gap, over a path previously traced from the positive terminal of battery 112 to the grid of the tube thence to the cathode of the tube and to the negative terminal of battery 222. With the tube conducting, line-group relay 230 now operates in the cathode-anode circuit of the tube which may be traced from battery 223 over the back contact of tie-line group 251 the inner lower back contacts of tie-line group relay 250 and of line-group relay 249 and of other line-group relays including relay 231 (not shown), the winding of relay 230, across the anode-cathode gap of tube 200 to the negative terminal of battery 222. Relay 230 thereupon operates, if no preceding line-group relay is at the time operated, and locks in a circuit from the positive terminal of battery 223, through the inner, lower front contact and winding of relay 230, thence across the anode-cathode gap of tube 200 to the negative terminal of battery 222, whereby relay 230 is maintained operated and tube 200 remains conducting.

Relay 230 upon operating also establishes a circuit from battery through the windings of start relays 500 and 501 in paralell of the No. 1 recorder, which is the first preference for the fifty lines whose directory numbers are 310 to 359 served by the five tubes 200 to 204, inclusive, outer right back contact of recorder busy relay 503, which relay will be unoperated if the No. 1 recorder is idle, conductor 504, inner upper front contact of relay 230, normal contacts of relay 224, conductor 227, back contact of relay 505, conductor 506 and thence over back contacts of relays 605, 615, 625 and 635, similar to relay 505, of the other recorders to ground. Relays 500 and 501 operate in this circuit, relay 500 upon operating establishing an obvious operating circuit for start relay 502. Had the No. 1 recorder been busy and its relay 503 therefore been operated, the start circuit would have been extended from ground on conductor 504 over the outer right front contact of relay 503, conductor 507, outer right back contact of busy relay 603 of the No. 2 recorder, if such recorder is at the time idle, to battery through the windings of start relays 600 and 601 of the No. 2 recorder. Had the No. 2 recorder also been busy and relay 603 thereof been operated, the start circuit would be further extended over the outer right front contact of relay 603 and over the outer right back contact of relay 613 to battery through the windings of start relays 610 and 611 of the No. 3 recorder. Had the No. 3 recorder also been busy and relay 613 thereof been operated, the start circuit would be further extended over the outer right front contact of relay 613 and over the outer right back contact of relay 623 to battery through the windings of start relays 620 and 621 of the No. 4 recorder. Had the No. 4 recorder also been busy and relay 623 been operated, the start circuit would be further extended over the outer right front contact of relay 623 and over the outer right back contact of relay 633 to battery through the windings of start relays 630 and 631 of the No. 5 recorder.

Had one of the fifty lines, whose directory numbers are 369 to 399 and 300 to 309 served by the five tubes 205 to 209, inclusive, initiated a call, the No. 2 recorder would have been started as a first preference over a circuit from ground on conductor 227, normal contacts of relay 224, inner upper back contacts of line group relays 230 to 234, inclusive, the inner upper back contacts of unoperated line relays of the group 235 to 239, inclusive, associated with tubes 205 to 209, inclusive, thence over the inner upper front contact of the operated one of this group of relays, for example, relay 239, conductor 507, outer right back contact of relay 603 to battery through the windings of start relays 600 and 601 of the No. 2 recorder. The No. 2 recorder is thus the first preference for these lines, the Nos. 3, 4, 5 and 1 recorders being taken for use in the order named if the No. 2 recorder is at the time busy, the start circuit being extended from the outer right front contact of relay 633 in the event that the Nos. 2 to 5 recorders are all busy over conductor 504, the outer right back contact of relay 503 to battery through the windings of start relays 500 and 501 of the No. 1 recorder if such recorder is idle.

Had one of the fifty lines whose directory numbers are 210 to 259, served by the five tubes 210 to 214 initiated a call, the No. 3 recorder would have been started as a first preference over a circuit from ground on conductor 227, normal contacts of relay 224, inner upper back contacts of line group relays 230 to 239, inclusive, the inner upper back contacts of unoperated relays of the group 240 to 244 associated with tubes 210 to 214, the inner upper front contact of the operated one of this group of relays, conductor 508, the outer right back contact of relay 613 to battery through the windings of start relays 610 and 611 of the No. 3 recorder if such recorder is idle. If the No. 3 recorder is at the time busy, the start circuit will be extended in a manner previously described to the first available recorder in the preference order 4, 5, 1 and 2. Had one of the fifty lines whose directory numbers are 260 and 299 and 200 to 209 served by the five tubes 215 to 219, initiated a call, the No. 4 recorder would have been started as a first preference over a circuit from ground on conductor 227, normal contacts of relay 224, inner upper back contacts of line-group relays 230 to 244, inclusive, inner upper back contacts of unoperated relays of the group 245 to 249, inclusive, associated with tubes 215 to 219, inclusive, the inner upper front contact of the operated one of this group of relays, conductor 509, the outer right back contact of relay 623 to battery through the windings of start relays 620 and 621 of the No. 4 recorder if such recorder is idle. If the No. 4 recorder is at the time busy, the start circuit will be extended in a manner previously described to the first available recorder in the preference order 5, 1, 2 and 3.

Had one of the tie-line trunks served by the two tubes 220 and 221 initiated a call, the No. 5 recorder would have been started as a first preference over a circuit from ground on conductor 227, normal contacts of relay 224, inner upper back contacts of line-group relays 230 to 249, inclusive, inner upper front contact of line-group relay 250, to conductor 510, if line-group relay 250 is operated or over the inner upper back contact of relay 250 and the inner upper front contact of line-group relay 251, if relay 251 is operated, to conductor 510, thence over the outer right back contact of relay 633 to battery through the windings of start relays 630 and 631 of the No. 5 recorder if such recorder is idle. If the No. 5 recorder is at the time busy, the start circuit will be extended in the manner previously described to the first available recorder in the preference order 1, 2, 3 and 4.

It will be noted that when any line-group relay, such as relay 239 operates, it opens at its inner upper back contact the circuit over which starting ground may be applied from conductor 227 to any of the recorder start circuits by the operation of other line-group relays positioned later in the chain of line-group relays and that since such operated line-group relay at its inner lower back contact opens the circuit over which battery 223 is connected to the windings of all line-group relays positioned earlier in the chain no earlier line-group relay may be operated, it is not possible for a start circuit to be closed to a second recorder on a second initiated call until a line finder has found the first calling line and the operated line-group relay has been released.

It will be recalled that the operation of line-group relay 230 caused the operation of start relays 500, 501 and 502 of the No. 1 recorder. Relay 502 upon operating closes a circuit from battery through the winding of relay 224, the upper back contact of relay 226, conductor 228, inner left contacts of relay 502 to ground at the outer right front contacts of relay 500 and relay 224 operates, opens at its upper normal contacts the previously traced start circuit for relays 500 and 501 which release, and at its upper alternate contacts establishes a locking circuit for itself and relay 502 which may be traced from battery through the winding of relay 224, upper back contact of relay 226, conductor 228, inner left front contacts of relay 502, conductor 511, upper alternate contacts of relay 224 to ground on conductor 227. In the event a later choice recorder should be started and then an earlier choice recorder should become free while relay 224 is in the act of operation, the start relay of the earlier recorder would lock up as described in connection with relay 502 and the later one would release.

Each recorder prefers one of five link circuits by which it may become associated with an idle line-finder-connector unit and having chosen a link circuit, any recorder chooses in a definite order among the six line-finder-connector units to which that link circuit has access. The No. 1 recorder chooses the link circuits in the order 1, 2, 3, 4 and 5, the No. 2 recorder in the order 2, 3, 4, 5 and 1, the No. 3 recorder in the order 3, 4, 5, 1 and 2, the No. 4 recorder in the order 4, 5, 1, 2 and 3 and the No. 5 recorder in the order 5, 1, 2, 3 and 4. The No. 1 link chooses line-finder-connector units in the order 1, 2, 3, 4, 5, 6, the No. 2 link chooses line-finder-connector units in the order 7, 8, 9, 10, 11, 12, the No. 3 link chooses line-finder-connector units in the order 13, 14, 15, 16, 17 and 18, the No. 4 link chooses the line-finder-connector units in the order 19, 20, 21, 22, 23 and 24 and the No. 5 link chooses line-finder-connector units in the order 25, 26, 27, 28, 29 and 30.

It will be assumed that at the time the start relay 502 of the No. 1 recorder circuit operated, the No. 1 link circuit was available for use as indicated by the fact that the hold magnets 910 and 911 of the line-finder link switch, allocated to the No. 1 link circuit are unoperated and that the No. 1 line-finder-connector unit, to which the No. 1 link circuit has access, is busy as indicated by the operated condition of its off-normal relay 920, corresponding to relay 720 of Fig. 7. A circuit is therefore established for the start relay 722 of the No. 2 line-finder-connector unit disclosed in Figs. 7 and 8 which may be traced from ground on conductor 227, over the upper normal contacts of relay 225, conductor 229, middle right front contact of relay 502, conductor 512, back contact of hold contact 911, conductor 923, upper front contact of relay 920, conductor 924, upper back contact of off-normal relay 720, middle lower back contact of relay 721, to battery through the winding of start relay 722. Had the No. 2 line-finder-connector unit been busy and its off-normal relay 720 therefore operated, the start circuit just traced would have been extended from conductor 924 over the upper front contact of relay 720, conductor 925, thence over the upper front contacts of off-normal relays of succeeding busy units and over the upper back contact of the off-normal relay of the first idle unit of the group to the start relay of such unit.

Had all of the line-finder-connector units of the first group of six, available from the No. 1 link circuit, been busy and therefore all of their off-normal relays been operated, with the off-normal relay 926 of the sixth unit operated, the start circuit would have been extended over the back contact of hold magnet 913 associated with the No. 2 link circuit, if such link circuit is not in use with another recorder, thence over back or front contacts of the off-normal relays 927—928 of the second group of units to the start relay of the first available unit of this group. In a similar manner, the start circuit may be extended to the start relay of another group of units.

If it be assumed that when the start relay 502 of the No. 1 recorder operated, the No. 1 link circuit was in use with another recorder and consequently the hold magnet 911 was operated, the previously traced start circuit would have been extended from conductor 512 over the lower front contact of magnet 911, the lower back contact of magnet 913 if the second link circuit was available, thence to a start relay of the second group of units over front or back contacts of the off-normal relays 927—928 of such units. Had the second link circuit been busy and hold magnet 913 associated therewith been operated, the start circuit would have been extended over the lower front contact thereof, the back contact of magnet 915, if the third link circuit was available, thence over conductor 1000 to a start relay of the third group of units, over front or back contacts of the off-normal relays 1001—1002 of such units. Had the third link circuit been busy and hold magnet 915 associated therewith been operated, the start circuit would have been extended over the lower front contact thereof, the back contact of hold magnet 917 if the fourth link circuit was available, thence to a start relay of the fourth group of units over front or back contacts of the off-normal relays 1003—1004 of such units. Had the fourth link circuit been busy and hold magnet 917 associated therewith been operated, the start circuit would have been extended over the lower front contact thereof, the back contact of magnet 919 if the fifth link circuit was available, thence to a start relay of the fifth group of units over front or back contacts of the off-normal relays 1005—1006 of such units.

If it be further assumed that the No. 2 recorder was seized to serve the call, then upon the operation of its start relay 602, a start circuit would be established from ground on conductor 229, over the middle right front contact of relay 602, conductor 606, back contact of magnet 913 if the No. 2 link circuit which is the first preference for the use of the No. 2 recorder is available, thence over back or front contacts of the off-normal relays 927—928 of the second group of units to the start relay of the first available unit of this group or if no unit of this group is available over the front contact of off-normal relay 928 of the last unit of the group, conductor 929, back contact of hold magnet 915, associated with the No. 3 link circuit if such link circuit is available for use, conductor 1000, thence over back or front contacts of the off-normal relays 1001—1002 of the third group of units to the start relay of the first available unit of this group. In a similar manner the start circuit may be extended to the start relays of other groups of units.

Finding the calling line

Figure 1:
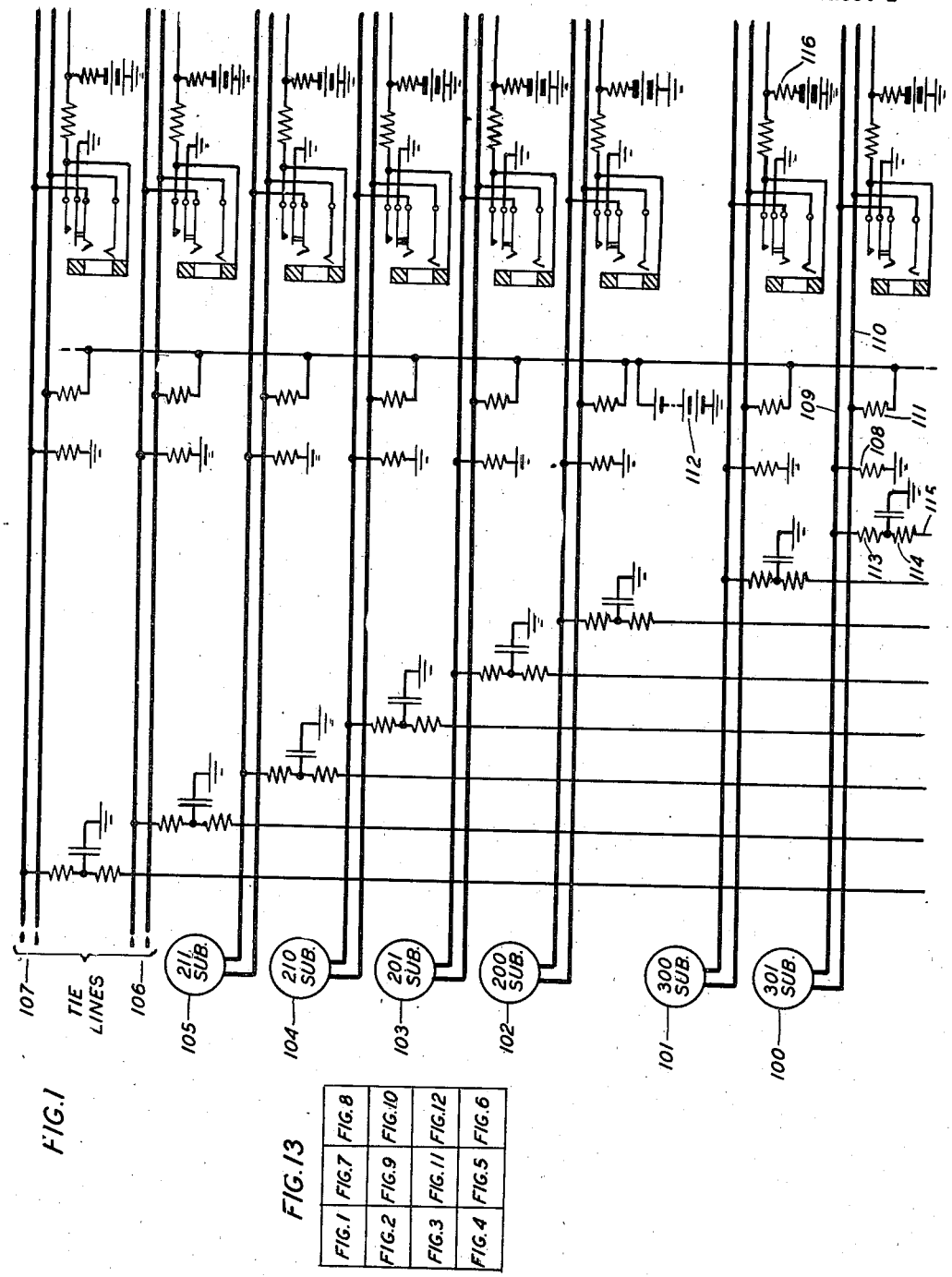
Fig. 1 shows a plurality of subscribers' station lines and a group of tie-line trunks.
Figure 2:
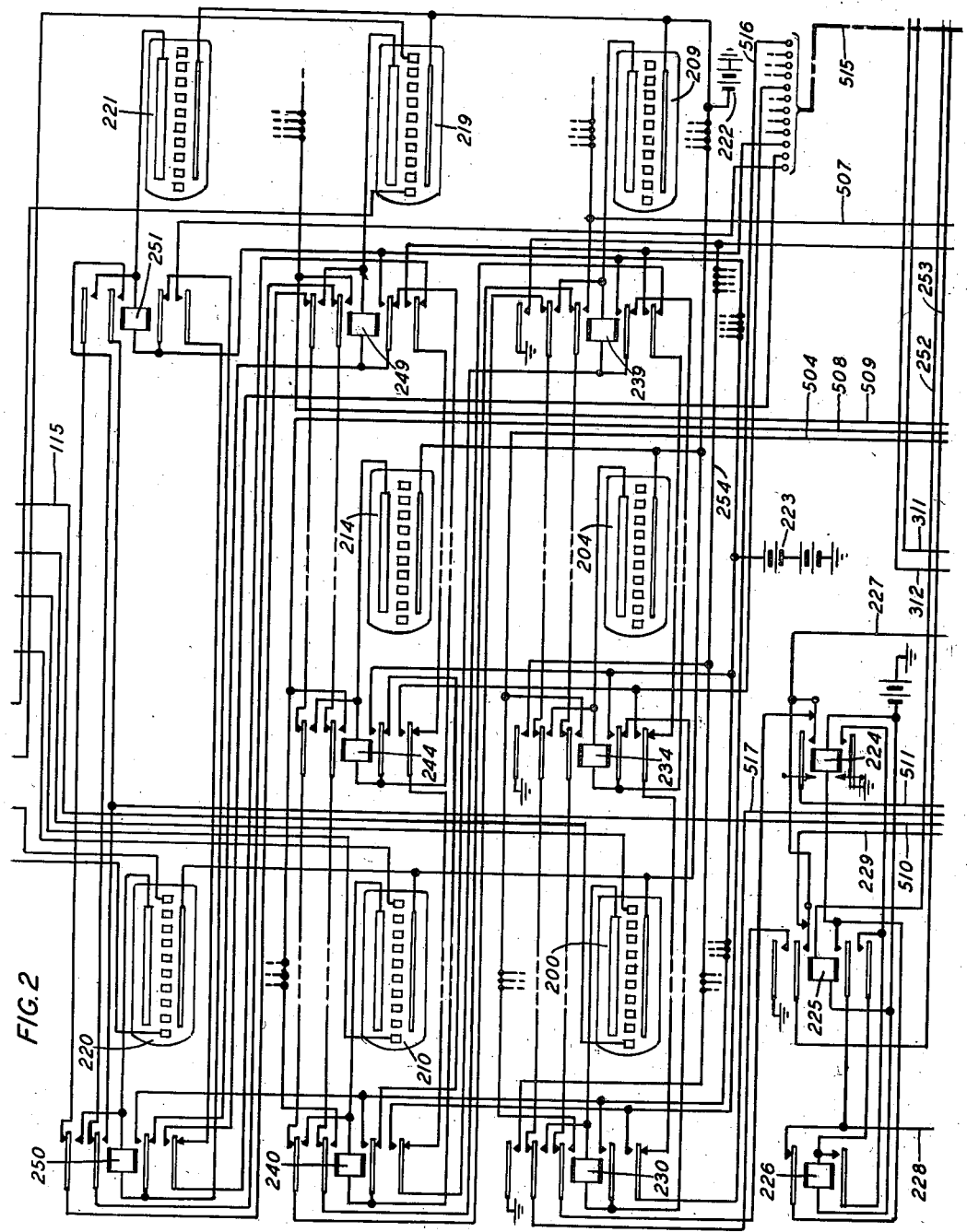
Fig. 2 shows a plurality of gas-filled tubes serving as group line relays for the several subgroups of station lines and tie-line trunks.

Start relay 502 upon operating also closed a circuit from 90-volt battery 514, the negative terminal of which is grounded, over the inner right front contact of relay 502, the inner right back contact of relay 503, to the anodes of all of the tubes of the chain 409 and, with start relay 500 operated, the left or control cathodes of tubes 405 to 414 of this chain are connected over conductors of cable 515, to the lower front contacts of the line-group relays of Fig. 2. Since it was assumed that the line-group relay 230 has been operated, a circuit is established from the control cathode of tube 414 over the No. 14 contact of relay 500, conductor 516 of cable 515, the lower front contact of relay 230, conductor 517, No. 4 contacts of relay 500, conductor 538 through high resistances 416 and 417 to ground. Since the right cathode of tube 414 is connected through resistance 422 to the negative terminal of battery 418, the positive terminal of which is grounded, the tube 414 fires over its cathode gap and is maintained in a conductive condition from battery 418 through resistance 422 across the cathode-anode gap of the tube to battery 514 so long as relay 502 remains operated. The firing of tube 414 registers in the recorder that the calling line is in the first subgroup of one of the banks.

When tube 414 becomes conducting a charging circuit for condenser 424 is established from the source 514 of 90-volt positive potential across the cathode-anode gap of the tube through the 100,000-ohm resistance 423, condenser 424 and the 10,000-ohm resistance 521 to the negative terminal of battery 520, the positive terminal of which is connected to ground. As soon as condenser 424 becomes charged, the point between resistances 423 and 425 reaches a positive potential of approximately 15 volts, there having been substantially 65 volts drop in potential across the anode-cathode gap of tube 414. This 15-volt positive potential is also applied through 10,000-ohm resistance 425 to the control cathode of tube 415, but the difference of potential between the cathodes of tube 415 is not sufficient to cause the tube to become conducting at this time but the tube is primed for future firing.

When start relay 722 operates as previously described, it establishes a circuit for relay 225 which may be traced from battery through its winding, conductor 252, inner upper front contacts of relay 722, upper back contact of off-normal relay 720, conductor 924, thence over the start circuit for relay 722 previously traced to ground. Relay 225 upon operating locks over conductor 252, the inner upper front contacts of relay 722, conductor 723, the lower back contact of start relay 930 of the first line-finder-connector unit, conductor 253, the upper alternate contacts of relay 225 to ground on conductor 227. Relay 722 locks to this locking circuit from battery through its winding, the middle lower back contact of relay 721, and the inner upper front contacts of relay 722. Relay 225 upon operating opens at its inner upper normal contacts the start circuit over which start relay 722 was initially operated. In case a late choice link circuit or a late choice line-finder-connector unit should be selected and then an earlier one should become free while relay 225 is in the act of operating, the earlier unit start relay would lock up and the latter one release. When both relays 224 and 225 have operated, a circuit is established from battery through the winding of relay 226, the lower front contact of relay 225 to ground at the lower front contact of relay 224 and relay 226 operates and locks over its lower front contact to ground at the lower front contact of relay 224. With relay 226 operated, relay 224 is held operated over the inner lower front contact of relay 225 from ground applied to conductor 228 and thus relay 224 is maintained operated until relay 225 releases. At its upper contact relay 225 connects ground over the middle upper front contact of line-group relay 230 to a point between the anode of tube 200 and the winding of relay 230, thereby extinguishing the tube 200 and holding relay 230 operated in a circuit through the winding of relay 230, the inner lower front contact thereof and to battery 223.

With recorder start relay 502 operated, a circuit is also established from ground on conductor 511 over the outer right front contact of relay 502, conductor 513 to battery through the winding of select magnet 1100, individual to the No. 1 recorder, of the recorder link switch of Figs. 11 and 12. With start relay 722 of the No. 2 line-finder-connector unit operated, a circuit is established from ground on conductor 723 over the next to inner upper front contact of relay 722, conductor 724 to battery through the winding of select magnet 904, corresponding to this unit, of the line-finder link switch of Figs. 9 and 10. With these two select magnets operated, a circuit is established from ground over the front contact of magnet 1100, conductor 1120, the front contact of magnet 904, conductor 931, the inner lower front contact of relay 722, conductor 932, to battery in parallel through the windings of hold magnets 910 and 1110 associated with the No. 1 link circuit. These magnets upon operating with the select magnets 904 and 1100 operated, close the cross-point contact sets 933 and 1121. A circuit is also established from ground over the lower contact of hold magnet 910, conductor 934, lower contact of hold magnet 1110 to battery through the winding of hold magnet 1111 and in parallel therewith over conductor 1122 to battery through the winding of hold magnet 911. Magnets 911 and 1111 now operate and with select magnets 904 and 1100 operated, the cross-point contact sets 935 and 1123 are closed. With the cross-point contact sets 933, 935, 1121 and 1123 closed, the No. 1 recorder is connected with the No. 2 line-finder-connector unit over conductors of the No. 1 link circuit. Upon the closure of the contacts of the cross-point contact set 1121, a locking circuit is established for hold magnet 1110 from battery through the winding and inner contact thereof, the outer right contacts of contact set 1121, conductor 1124 to ground at the outer left contact of recorder start relay 502.

With ground connected to conductor 1124, hot cathode gas-filled tube 300 fires in a circuit from negative battery through resistance 301, resistance 302 across the grid-cathode gap of the tube to ground on conductor 1124 and upon firing operates relay 303 in a circuit from positive battery through the winding of relay 303 across the anode-cathode gap of tube 300 to ground on conductor 1124. Relay 303 upon operating closes a circuit from ground over the next to outer right back contact of relay 503, conductor 518, lower front contact of relay 303, upper back contact of relay 304, upper back contact of relay 305, next to upper back contact of relay 306, conductor 307, left contacts of cross-point contact set 1121, front contact of hold magnet 1111, conductor 1125, inner front contact of hold magnet 911, outer left contacts of cross-point contact set 933, conductor 936, next to inner lower front contact of relay 722, to battery through brake magnet 704 of the line finder. Magnet 704 operates, removes its brake shoe from the driving tape of the switch and establishes a circuit through the secondary winding of transformer 726, the primary winding of which is connected to one phase of the source 725 of alternating current, thence over the contacts of magnet 704 through the stator winding 728 of motor 705 and establishes a second circuit from the mid-point of the secondary winding of transformer 727, the primary winding of which is connected to the second phase of the source 725, over the contacts of magnet 704, through the shaded pole windings of motor 705, the upper front contact of relay 722, conductor 937, the next to outer left contacts of cross-point contact set 933, link circuit conductor 938, the next to outer left contacts of cross-point contact set 1121, conductor 308, upper back contact of relay 306, inner upper back contact of relay 309, lower back contact of relay 306, lower back contact of relay 310, conductor 311, to the right terminal of the secondary winding of transformer 727 if relay 310 is unoperated, indicating that the calling line is located in one of the upper terminal banks and that the line finder must therefore be driven upwardly, or over the upper front contact of relay 310, conductor 312 to the left terminal of the secondary winding of the transformer 727 if relay 310 is operated indicating that the calling line is located in the lower terminal bank and that the line finder must therefore be driven downwardly. Since it was assumed that the line 100 located in the lower terminal bank initiated the call and line-group relay 230 was operated, relay 310 is therefore operated in a circuit over the upper front contact of relay 230, conductor 254, next to outer left front contact of relay 502, next to inner right back contact of relay 503, conductor 519, winding of relay 310 to battery. It will be noted in this connection that relay 310 will be operated when any one of the line-group relays 230 to 239 inclusive, serving subgroups of lines terminating in the lower bank, is operated upon an initiated call.

With relay 310 operated, the motor 705 drives the wiper set of the line finder at a high speed downwardly from its normal position, the off-normal contact springs 703 being moved to their lower position as soon as the wiper set leaves its normal position. As the sleeve wiper 702 passes over the sleeve terminal of each group terminal set, such as 706, a circuit is established from positive battery connected to each such sleeve terminal, over wiper 702, inner upper normal contacts of relay 721, conductor 939, next to outer right contacts of cross-point contact set 933, link circuit conductor 940, next to outer right contacts of cross-point contact set 1121, conductor 313, upper back contact of relay 309, winding of polarized group counting relay 314, to ground. Relay 314 upon each operation establishes a circuit from ground over its front contact, conductor 315, to a point between resistance 521 and condenser 424 and other similar condensers for causing the firing of successive tubes of the chain 400. Since, however, it has been assumed that tube 414 was fired to designate the first subgroup of station lines terminating in the lower bank, the first operation of relay 314 when the sleeve wiper 702 engages the sleeve of the first group terminal set 706, causes the potential at the lower terminal of condenser 424 to be increased from negative 50 volts to zero or ground potential thereby raising the potential at the other terminal of such condenser to positive 65 volts. A sufficient difference of potential is now established between the cathodes of tube 415 to cause it to fire and to operate relay 306 in a circuit over the cathode-anode path therethrough from battery 316 through the winding of relay 306, conductor 317, the cathode-anode path through the tube 415 to the anode battery 514.

Relay 306 upon operating, opens at its inner upper back contact, the circuit of brake magnet 704 which releases to open the circuits of motor 705 and to apply the brake shoe to the driving tape, but due to its speed of movement, the wiper set thereof will not stop so quickly but that the sleeve wiper 702 will pass off the group sleeve terminal of the first group terminal set 706, thereby opening the circuit of relay 314 which thereupon releases and, since relay 306 has now operated, establishes a circuit from ground over its normal contacts, the inner upper front contact of relay 306 to battery through the winding of slow-to-release relay 305. Relay 305 operates, locking over its inner lower front contact, the lower back contact of relay 309, conductor 319, the inner left back contact of relay 503 to ground on conductor 1124, and recloses the previously traced operating circuit for the brake magnet 704 over the middle upper front contact of relay 306 and the upper front contact of relay 305. Brake magnet 704 now operates to close the circuits of motor 705, but with relay 306 now operated, the motor operates in a reverse direction to drive the wiper set upwardly at a slow speed. The circuit through the shaded pole windings of the motor 705 extends as previously traced from the mid-point of the secondary winding of transformer 727 to conductor 308, thence through resistance 318, the lower front contact of relay 306, the lower front contact of relay 310 and conductor 311 to the right terminal of the secondary winding of transformer 727.

As a further result of tube 415 firing, the potential on the right terminal of commutating condenser 427 is raised from negative 50 volts applied thereto from battery 316 through the winding of relay 306 to positive 15 volts, whereby the 15-volt positive potential applied to its left terminal and to the right cathode of tube 414 when tube 414 fired, is raised to positive 65 volts potential whereby a difference of only 15 volts potential is now effective between the right cathode and the anode of tube 414, whereupon tube 414 becomes extinguished. Tube 415 upon firing also charges condenser 426 in a circuit from positive battery 514 across the cathode-anode gap of tube 415 through the 100,000-ohm resistance 428, condenser 426, resistance 521 to the negative battery 520, whereby after condenser 426 becomes charged, the point between resistances 428 and 429 reaches a positive potential of 15 volts and this potential is applied over conductor 522 to the control cathode of tube 405 to prime such tube for later operation.

When the sleeve wiper 702 in its return movement again engages the sleeve terminal of group terminal set 706, the previously traced circuit of relay 314 is again established and relay 314 operates to connect ground to a point between resistance 521 and condenser 426 whereupon in the manner previously described, in connection with tube 415, the potential difference between the cathodes of tube 405 is increased to such an extent that tube 405 fires thereby priming tube 406 for operation and extinguishing tube 415. Tube 415 upon becoming extinguished releases relay 306 to open the circuit of brake magnet 704, which thereupon releases to stop the motor 705 and to arrest the wiper set upon the group terminal set 706. With relay 306 released and relay 305 operated, a circuit is established from ground over the inner lower back contact of relay 306, lower front contact of relay 305 through the winding of relay 309 to battery, whereupon relay 309 operates, locks over its middle lower front contact to ground on conductor 319 and opens at its lower back contact the locking circuit of relay 305 which thereupon releases. With relays 305 and 306 now both released, the previously traced circuit for brake magnet 704 is closed, whereupon the brake magnet operates to reclose the circuits of motor 705. At this time the circuit for the shaded pole windings of the motor extends from the mid-point of the secondary winding of transformer 727, over the contacts of brake magnet 704 through the shaded pole windings of the motor and thence as traced to conductor 308, through resistance 318, over the lower back contact of relay 306, the upper front contact of relay 310, conductor 312 to the left terminal of the secondary winding of transformer 727. Motor 705 is therefore operated at a low speed in such a direction as to drive the linefinder wiper set downwardly in a line terminal hunting movement.

When the sleeve wiper 702 engages the sleeve terminal of the first line 101 of the first subgroup, a circuit is established from negative battery through resistance 116, sleeve terminal 729, wiper 702, thence as traced to conductor 313, upper front contact of relay 309 to a point between resistances 301 and 302, whereby tube 300 becomes extinguished and releases relay 303. Relay 303 upon releasing opens at its lower contact the circuit of brake magnet 704 thereby arresting the wiper set upon the terminal set of the first line of the subgroup and establishes a circuit for relay 320 which may be traced from battery through the winding of relay 320, the upper back contact of relay 321, the inner lower front contact of relay 309, conductor 322, upper back contact of relay 487, upper back contact of relay 488, conductor 323, lower back contact of relay 303, conductor 518 to ground at the next to outer right back contact of relay 503. Relay 320 upon operating closes an obvious operating circuit through the lower winding of relay 321 which thereupon operates and locks over its upper winding and upper front contact, over the operating circuit just traced for relay 320. At its upper back contact relay 321 opens the circuit of relay 320 which now releases and closes a circuit for brake magnet 704 which now extends from ground over the lower back contact of relay 320 and the lower front contact of relay 321, thence as traced to battery through the winding of magnet 704. With magnet 704 reoperated, the wiper set is again advanced and the sleeve wiper 702 thereof upon leaving the sleeve terminal set 729 permits tube 300 to refire and to reoperate relay 303. At its lower back contact relay 303 opens the locking circuit of relay 321 which now releases to open the circuit of brake magnet 704, but since relay 303 upon operating reestablished the original operating circuit of magnet 704, magnet 704 does not release to stop the advance movement of the switch wipers.

When relay 320 released to start the wiper set off the terminal set of the first line, with relay 321 operated, a circuit was closed from ground over its inner upper back contact, the inner lower front contact of relay 321, the upper back contact of relay 324, conductor 343, the back contact of relay 523 to a point between resistance 521 and condenser 430 whereupon tube 406 fires, tube 405 is extinguished and tube 407 is prepared for firing. The operations just described are under the supposition that the first line 101 is not the calling line.

These operations are repeated to step the wiper set over the terminal sets of the lines of the group until it reaches the terminal set of a line which is calling. If the wiper set reaches and starts off the tenth line terminal set without having encountered a calling line, for example, if the calling subscriber has hung up too quickly, tubes 407, 408, 409, etc., and including tube 415 will have fired in succession and relay 306 will be operated in response to the firing of tube 415. Relay 306 upon operating now closes the circuit of false start relay 505 which may be traced from battery, through the winding of relay 505, conductor 524, lower front contact of relay 309, to ground at the inner lower front contact of relay 306. Relay 505 upon operating releases relays 224 and 502 whereupon all operated apparatus releases except the wiper set and off-normal relay 720 of the line-finder-connector unit which relay operated over the lower contacts of off-normal springs 703 when the wiper set moved from its normal position. With relay 722 released and relay 720 operated, a circuit is established from battery through brake magnet 704, next to the lower back contact of relay 722, next to the lower back contact of relay 721, inner lower front contact of relay 720 to ground at the lower off-normal springs 703. Magnet 704 upon operating now closes a circuit from the mid-point of the secondary winding of transformer 727, over its contacts through the shaded pole windings of motor 705, the upper back contact of relay 720, the next to upper back contact of relay 721, the upper alternate contacts of off-normal springs 703, conductor 311 to the right terminal of the secondary winding of transformer 727 whereupon the motor 705 is operated in such a direction as to return the wiper set to its normal position, in which position the off-normal springs 703 are restored to their neutral position thereby opening the circuit of off-normal relay 720, brake magnet 704 and motor 705.

It will be assumed, however, that when the wiper set has advanced to the line terminal set 700 of the calling line 100, the line is still in a calling condition. The tip wiper 700 will therefore encounter positive potential applied to the tip terminal 730 of the line from battery 112 over the calling line loop and a circuit will be completed over wiper 700, the inner lower back contact of relay 721, conductor 941, the outer left contacts of cross-point contact set 935, link circuit conductor 942, the outer left contacts of cross-point contact set 1123, conductor 525, the outer left back contact of relay 503, conductor 526, the inner upper front contact of relay 309, to the grid of tube 325 which thereupon fires and operates relay 326 in its cathode-anode circuit.

Relay 326 upon operating closes a circuit from ground over its lower contact and conductor 327 to battery through the winding of relay 503 which thereupon operates, locks over its inner left front contact to ground on conductor 1124; extends the recorder start circuit from conductor 504 to conductor 507; opens the locking circuit of relay 309 at its inner left back contact; opens the circuit of relay 310, if closed, at its next to inner right back contact; at its next to outer right back contact removes ground from the lower transfer contact of relay 303 and at its inner right back contact disconnects 90-volt battery 514 from the anodes of all tubes of the chain 400. Relays 309 and 310 thereupon release and any fired tube of chain 400 is extinguished. The removal of ground from the lower transfer contact of relay 303 opens the circuit of brake magnet 704 whereupon the wiper set of the line finder is stopped upon the terminal set 708 of the calling line 100.

Relay 326 also closes a circuit from ground over its upper contact, conductor 328, the next to outer right contacts of cross-point contact set 1123, link circuit conductor 943, the next to outer right contact of cross-point contact set 935, conductor 944 to battery through the winding of slow-to-release relay 731 and over the upper normal contacts of relay 731 to battery through the winding of relay 721. Relay 731 upon operating establishes a local holding circuit for relay 721 over its upper alternate contacts and at its lower contacts connects ground to locking conductor 732. Relay 721 upon operating permits tube 325 to restore and opens the circuit of relay 722 which releases, in turn releasing relays 225, 224 and 226, relay 224 in turn releasing recorder start relay 502 and recorder link select magnet 1100. Relay 722 upon releasing releases the linefinder link select magnet 904. The cross-point contact sets 933, 935, 1121 and 1123 are, however, maintained closed by the continued operation of the hold magnets 910, 911, 1110 and 1111, magnet 910 being locked over its inner lower front contact and the outer right contacts of cross-point contact set 933, conductor 945, the upper front contact of relay 721, to ground at the No. 4 upper contact of relay 733, and its locking ground being applied over conductor 932 through the winding of hold magnet 1110 to battery. Magnets 910 and 1110 in turn hold magnets 911 and 1111 operated. The holding ground is also applied over the inner lower front contact of magnet 1110 and the outer right contacts of cross-point contact set 1121 to conductor 1124.

Relay 225 upon releasing releases line-group relay 230 unless the tube 200 is immediately fired by another line calling in the same subgroup. A new call can now be started. With relay 503 operated, when relay 721 operates, a dialing loop is established from ground at the No. 5 upper contacts of relay 733, over the next to inner lower front contact of relay 721, tip wiper 700 and tip terminal 730, tip line conductor 109 through the substation of calling line 100, ring conductor 110, ring terminal 734, ring wiper 701, inner lower front contact of relay 721, inner upper normal contacts of relay 733, conductor 941, outer left contacts of cross-point contact set 935, link circuit conductor 942, outer left contacts of cross-point contact set 1123, conductor 525, outer left front contact of relay 503, conductor 527, through the winding of pulse responsive relay 329 to battery. Relay 329 in operating closes an obvious circuit from ground over the innner lower normal contacts and through the winding of hold relay 330 which operates and locks over its inner lower front contact to ground on conductor 1124. The calling line is now held busy by ground through resistance 735, applied over the inner upper front contacts of relay 721 and over sleeve wiper 702 to the sleeve terminal of the line. Relay 329 also connects ground from the upper back contact of relay 495 over the lower front contact of relay 329, thence as traced to battery through the winding of relay 731 whereby relay 731 is held operated following the release of relay 326 and being slow to release will not release during the momentary releases of relay 329 in response to dialing. Should the calling subscriber abandon the call before the recorder has completed its functions, relay 329 will release in turn releasing relays 721 and 731 of the line-finder-connector unit thereby releasing all operated apparatus.

The recorder is now ready to record dial impulses, relays 503, 329, 330 and 303 thereof being operated and relays 720, 721 and 731 of the linefinder-connector unit being also operated. With relay 330 operated, a dialing tone start circuit is established from ground at the upper front contact of relay 330, over conductor 331, the middle lower back contact of relay 494, conductor 332, inner upper front contact of relay 330, conductor 333, back contact and upper winding of relay 826 to battery. Relay 826 operates, interrupting its own operating circuit intermittently and inducing a tone current in its lower winding which is transmitted from ground through such lower winding, conductor 827, condenser 431, lower back contact of relay 494, to conductor 527 and thence as traced over the calling line loop. Condensers 828, 829 and 830 and resistances 831 and 832 are provided in conjunction with relay 826 to generate a satisfactory tone current and to provide means for transmitting it where required. When the calling subscriber hears the dial tone he is appraised of the fact that the register equipment of a recorder has been associated with his line in readiness to receive the dial impulses of a desired line number.

*Registering the called station number*

It has been assumed that the calling subscriber desires to establish a connection with the station line 823 whose directory number is 391. The subscriber will first proceed to dial the hundreds digit 3 whereupon pulse receiving relay 329 will release three times in response to the three openings of the dialing loop. On the first release of relay 329 the circuit of relay 334 is completed from battery through the winding thereof, the upper back contact of relay 329 to ground on conductor 331 and due to its slow-to-release characteristic remains operated until a short time after the operation of relay 329 following the third opening of the dialing loop. At its lower contact, relay 334 connects the 90-volt positive battery 335 over conductor 336, the upper back contact of relay 528 and conductor 529 to the anodes of all tubes of the chain 450 and through resistance 432 to ground whereupon tube 451 fires and in the manner previously described in connection with the operation of tube 414 primes tube 452 in readiness for subsequent firing. Thereafter upon each operation of relay 329, following its first release, a circuit is established from ground at its front contact over the lower front contact of relay 330, conductor 337, upper back contact of relay 494, conductor 530 to a point between resistance 537, connected to negative 50-volt battery, and the lower terminals of condensers such as 433 whereby successive tubes of the chain 450 are fired, preceding tubes are extinguished and succeeding tubes are primed in the manner previously described. Thus in response to dialing the hundreds digit 3, tubes 451, 452, 453 and 454 will be fired in succession and when tubes 453 and 454 fire, relays 487 and 488 will be operated over the cathode-anode paths of such tubes. However, when tube 454 fires, tube 453 will be extinguished so that upon the completion of dialing the hundreds digit 3, only register relay 488 will remain operated in a circuit from 50-volt negative battery through its lower winding across the cathode-anode path of tube 454 to 90-volt positive battery connected to conductor 529. Had the subscriber dialed the hundreds digit 2, 7, 8, 9 or 0, then the corresponding hundreds register relays 487, 489, 490, 491 or 492 will remain operated at the end of the dialing of such digit.

Upon the operation of hundreds register relay 488 as described or register relay 487, had the hundreds digit 2 been dialed to establish a connection to a station line terminating in the middle terminal bank, 90-volt battery 434 is connected over the lower front contacts of such relays, conductor 531, lower back contact of relay 528 to conductor 529 whereby the fired tube 453 or 454 is maintained in a conducting condition following the release of relay 334 at the completion of the dialing of the hundreds digit and the disconnection of battery 335 thereby. Relay 334 upon releasing with either register relay 487 or 488 operated, establishes a circuit from ground over its upper back contact, conductor 338, next to inner upper front contact of either of these register relays to battery through the winding of relay 494 which upon operating locks over its lower front contact to ground on conductor 331. Relay 494 at its upper back contact opens the circuit previously traced from the upper front contact of relay 329 to conductor 530 over which relay 329 controlled the successive firing of tubes of chain 450 and prepares a circuit from ground over its inner upper front contact, conductor 339, lower back contact of relay 329, now open, conductor 340, inner lower back contact of relay 532, to a point between resistance 521, connected to 50-volt negative battery, and the lower terminals of condensers such as 426 associated with the tubes of chain 400 whereby tubes of the chain 400 may be successively fired upon the subsequent releases of relay 329 in response to the dialing of the seconds or tens digit. At its inner upper front contact relay 494 also establishes a locking circuit for register relay 488 which extends to battery over the inner upper front contact and through the upper winding of relay 488. With hundreds register relay 488 operated as above described, a circuit is established for relay 310 extending from battery through its winding, conductor 519, lower back contact of relay 532, conductor 533, to ground at the lower contact of relay 488 whereupon relay 310 locks over its inner upper front contact and conductor 341 to ground at the inner upper front contacts of relay 494 and prepares the recorder to control a connector switch to connect with a line terminating in the lower terminal bank. If either register relay 487 or 488 is operated, a circuit is also closed from ground through resistances 417 and 416, the inner lower front contact of either of these register relays to the left or control cathode of tube 404 and with 90-volt positive potential applied from battery 434 over the next to inner upper front contact of relay 494 and conductor 535 to the anodes of the tubes of chain 400, the tube 404 is thereupon fired.

Had the subscriber dialed a hundreds digit 7, 8, 9 or 0 and thus caused the operation of hundreds register relay 489, 490, 491 or 492, the 90-volt positive battery 434 will be connected over the lower front contact of the operated one of these register relays to conductor 529 and thence to the anodes of the tubes of the chain 450 to maintain any fired tube conducting after the release of relay 334, following the termination of the dialing of the hundreds digit. When relay 334 releases a circuit is closed from ground over its upper back contact, conductor 338 and the inner upper front contact of the operated register relay 489, 490, 491 or 492 to battery through the winding of relay 494 and in parallel therewith, over the middle upper front contact of the operated one of these register relays, conductor 534, to battery through the windings of relays 532 and 528 in series, which relays operate and lock over the lower front contact of relay 528 to ground on conductor 331. Relay 494 upon operating connects 90-volt positive battery 434 to the anodes of all tubes of chain 400 as previously described and therefore if register relay 489 is operated to register the hundreds digit 7, ground through resistances 417 and 416 and over the inner lower front contact of relay 489 is applied to the control cathode of tube 404 to fire such tube. If register relay 490 is operated to register the hundreds digit 8, ground through resistances 417 and 416 and over the inner lower front contact of relay 490 is applied to the control cathode of tube 403 to fire such tube. If register relay 491 is operated to register the hundreds digit 9, ground through resistances 417 and 416 and over the inner lower front contact of relay 491 is applied to the control cathode of tube 402 to fire such tube and if register 492 is operated to register the hundreds digit 0, ground through resistances 417 and 416 and over the inner front contact of relay 492 is applied to the control cathode of tube 401 to fire such tube. No more digits should be dialed, but if any are dialed, they will have no substantial effect.

If digit 1, 4, 5 or 6 is dialed in error or there is a preliminary impulse, the release of relay 334 following such digit will disconnect battery 335 from the tubes of chain 450 and since no hundreds register relay has been operated and the substitute battery 434 was not connected, the fired tube of chain 450 will be extinguished and the circuits will then be in the condition in which they were prior to dialing.

When the subscriber dials the second or tens digit, in the case assumed digit 9, relay 329 releases on each opening of the dialing loop by the dial and relay 334 operates on the first release and remains operated until after relay 329 operates following its last release. In operating relay 334 closes a circuit from ground over its upper front contact, conductor 342, upper front contact of register relay 488, inner lower front contact of relay 494, conductor 536, upper back contact of relay 532, to battery through the winding of relay 528. Relay 528 thereupon operates and locks through its winding and the winding of relay 532 and over its lower front contact to ground on conductor 331, but relay 532 being shunted does not operate in this locking circuit so long as relay 334 remains operated. Upon each release, relay 329 closes a circuit from ground at the inner upper front contact of relay 494, over conductor 339, lower back contact of relay 329, conductor 340, inner lower back contact of relay 532 to a point between resistance 521, connected to negative 50-volt battery, and the lower terminals of condensers such as 426, whereby successive tubes of the chain 400 are fired. Since tube 404 was previously fired upon the operation of hundreds register relay 488, tubes 405, 406, etc. fire in succession in response to successive releases of relay 329 until upon the ninth or last release of the relay 329, tube 413 is fired and tube 414 is primed for subsequent operation. At this time all previously fired tubes of the chain are extinguished. At the end of the tens digit series, relay 329 remains operated and relay 334 releases whereupon relay 532 operates in the locking circuit of relay 528. When relay 528 operated it, at its lower back contact, disconnected battery 434 from conductor 529 and the anodes of tubes of chain 450 and, at its upper back contact, disconnected battery 335 from conductor 529 whereby any fired tube of chain 450, in the case assumed tube 454, is extinguished. When relay 532 operates, battery 434 is connected over the inner lower front contact thereof to conductor 529 and tube 451 of chain 450 thereupon fires. After tube 454 becomes extinguished register relay 488 is maintained operated over its locking circuit previously traced.

When the third digit is dialed, relay 329 releases upon each opening of the dialing loop and relay 334 operates on the first release, remaining operated until relay 329 remains operated following the opening of the dialing loop on the last impulse. Upon each release of relay 329 a circuit is established from ground over the inner upper front contacts of relay 494, conductor 339, lower back contact of relay 329, conductor 340, lower front contact of relay 532, lower back contact of relay 539 to a point between resistance 537 and the lower terminals of condensers such as 433 associated with the tubes of chain 450 whereby tubes of this chain are successively fired, preceding tubes are extinguished and succeeding tubes are primed for operation in the manner previously described. Since it was assumed that the subscriber dialed the units digit 1, upon the first release of relay 329, tube 452 remains conducting, tube 453 is primed for subsequent operation and tube 451 is extinguished. When relay 334 operates, a circuit is established from ground over its upper front contact, conductor 342, upper front contact of relay 488, inner lower front contact of relay 494, conductor 536, upper front contact of relay 532, upper back contact of relay 539 to battery through the winding of relay 523. Relay 523 thereupon operates and locks through the winding of relay 539 and over its own front contact to ground on conductor 331, but the winding of relay 539 being shunted so long as relay 334 remains operated, does not operate. At the end of the transmission of the third series of impulses when relay 334 releases, relay 539 operates in the locking circuit of relay 523 and opens the pulsing path from the lower back contact of relay 329 over which the successive firing of the tubes of chain 450 are controlled so that no further tubes of this chain may be erroneously fired.

When relay 532 operates after the tens digit series of dial impulses is received, on a station call, or after the hundreds series of dialed impulses is received on a trunk call, it closes a circuit from ground at its inner upper front contact, over conductor 518, front contact of relay 303, upper back contact of relay 304, back contact of relay 305, inner upper back contact of relay 306, conductor 307, outer left contacts of cross-point contact set 1121, front contact of hold magnet 1111, conductor 1125, inner lower front contact of hold magnet 911, outer left contacts of cross-point contact set 933, conductor 936, inner lower back contact of relay 722, conductor 736 to battery through brake magnet 804 of the connector switch of the No. 2 unit. Magnet 804 upon operating removes its brake shoe from the driving tape of the switch and connects the windings of the motor 805 to the secondary windings of transformers 726 and 727. The circuit of stator winding 833 extends through the secondary winding of transformer 726 and the contacts of magnet 804. Under the assumption that the line 823 terminating in the lower terminal bank has been called, and that the operation of the hundreds register relay 488 has operated relay 310, the circuit of the shaded pole windings of motor 805 extends from the mid-point of the secondary winding of transformer 727, over conductor 737, contacts of brake magnet 804, shaded pole windings of motor 805, conductor 738, next to outer upper back contact of relay 722, conductor 937, next to outer left contacts of cross-point contact set 933, link circuit conductor 938, next to outer left contacts of cross-point contact set 1121, conductor 308, upper back contact of relay 306, next to upper back contact of relay 309, lower back contact of relay 306, upper front contact of relay 310, and conductor 312 to the left terminal of the secondary winding of transformer 727. Motor 805 is thus operated in such a direction as to drive the connector wiper set downwardly at a high speed. As soon as the brush set leaves its neutral position, the off-normal contacts 803 operate to their lower alternate positions thereby closing a second holding circuit over conductor 866 through the upper winding of off-normal relay 720.

As the sleeve wiper 802 passes over the sleeve terminals of successive group terminal sets such as 706, 806, etc. a circuit is established from positive battery, connected to each such sleeve terminal over wiper 802, conductor 834, the next to inner upper front contact of relay 721, conductor 939 and thence as previously traced to ground through the winding of group counting relay 314. Relay 314 upon each operation establishes a circuit from ground over its front contact and conductor 315 to a point between resistance 521 and the lower terminals of the condensers associated with the tubes of chain 400 for causing the firing of successive tubes of this chain. Since, however, it has been assumed that tube 413 was fired to designate the second subgroup of station lines, including lines 390 to 399, terminating in the lower bank, the first operation of relay 314 when the sleeve wiper 802 engages the sleeve terminal of the first group terminal set 706, causes the tube 414 which was primed by the firing of tube 413 to fire, whereupon tube 413 is extinguished and tube 415 is primed as previously described. Thereafter when the wiper 802 engages the sleeve terminal 835 of the group terminal set 806 and relay 314 again operates, tube 415 is fired, tube 414 is extinguished and the tube 405 is primed for subsequent operation. Tube 415 upon firing causes the operation of relay 306 in the manner previously described.

Relay 306 upon operating opens at its inner upper back contact the circuit of brake magnet 804 which releases to open the circuits of motor 805 and to apply its brake shoe to the driving tape, but due to its speed of movement the wiper set thereof will not stop so quickly but that the sleeve wiper 802 will pass off the group sleeve terminal 835 thereby opening the circuit of relay 314 which thereupon releases and since relay 306 has been operated, establishes a circuit from ground over its normal contacts, the inner upper front contact of relay 306 to battery through the winding of relay 305. Relay 305 operates, locking over its inner lower front contact, the lower back contact of relay 309, conductor 313 and the middle upper front contact of relay 532 to ground on conductor 1124 and recloses the previously traced operating circuit for the brake magnet 804 over the middle upper front contact of relay 306 and the upper front contact of relay 305. Brake magnet 804 now operates to close the circuits of motor 805 but with relay 306 now operated, the motor operates in a reverse direction to drive the wiper set upwardly at a low speed. The circuit through the shaded pole windings of the motor 805, extends as previously traced from the mid-point of the secondary winding of transformer 727 to conductor 308 thence through resistance 318, the lower front contact of relay 306, the lower front contact of relay 310, and conductor 311 to the right terminal of the secondary winding of transformer 727.

When the sleeve wiper 802 in its return movement again engages the sleeve terminal 835, the previously traced circuit of relay 314 is again established and relay 314 again operates to cause tube 405 to fire, tube 406 to be primed and tube 415 to be extinguished. Tube 415 upon being extinguished releases relay 306 to open the circuit of brake magnet 804 which thereupon releases to stop motor 805 and to arrest the wiper set upon the group terminal set 806. With relay 306 released and relay 305 operated, a circuit is established from ground over the inner lower back contact of relay 306, lower front contact of relay 305, through the winding of relay 309 to battery, whereupon relay 309 operates, locks over its middle lower front contact to ground on conductor 319 and opens at its middle lower back contact, the locking circuit of relay 305 which thereupon releases. With relays 305 and 306 now both released, the previously traced circuit for brake magnet 804 is closed whereupon it operates to reclose the circuits of motor 805. At this time the circuit for the shaded pole windings extends from the mid-point of the secondary winding of transformer 727 as traced to conductor 308, thence through resistance 318 over the lower back contact of relay 306, the upper front contact of relay 310, conductor 312 to the left terminal of the secondary winding of transformer 727. Motor 805 is therefore operated at a low speed in such a direction as to move the wiper set of the connector switch downwardly over the subgroup of terminals 807—808.

When the sleeve wiper 802 engages the sleeve terminal 837 of the first line 822 of this subgroup, a circuit is established from negative battery through 600-ohm resistance 836, sleeve terminal 837, wiper 802, thence as traced to conductor 313, over the upper front contact of relay 309 to a point between resistances 301 and 302 whereby tube 300 becomes extinguished and releases relay 303. Relay 303 upon releasing opens at its lower front contact the circuit of brake magnet 804 thereby arresting the wiper set of the connector upon the terminal set 807. The wiper set remains on the terminal set 807 until the third or units digit has been received since relay 488 is locked operated to hold open the operating circuit of relay 320. When the third digit has been dialed and registered and relay 539 has therefore operated, the circuit of relay 320 is again effective and may be traced from battery through the winding of relay 320, the upper back contact of relay 321, the inner lower front contact of relay 309, conductor 322, the upper front contact of relay 539, conductor 323, the lower back contact of relay 303, conductor 513 to ground at the inner upper front contact of relay 532. Relay 320 upon operating closes an operating circuit through the lower winding of relay 321 which thereupon locks over its upper winding and upper front contact over the operating circuit just traced for relay 320. At its upper back contact relay 321 opens the circuit of relay 320 which releases after an interval determined by its slow-to-release characteristic and closes a circuit for brake magnet 804 which now extends from ground over the lower back contact of relay 320, the lower front contact of relay 321, thence as traced to battery through the winding of magnet 804. With magnet 804 reoperated, the wiper set is again advanced and the sleeve wiper 802 thereof upon leaving the sleeve terminal 837 permits tube 300 to refire and to reoperate relay 303 which at its lower back contact opens the locking circuit of relay 321 which now releases to open the circuit of brake magnet 804. Since, however, relay 303 upon operating reestablished the original operating circuit of relay 804, magnet 804 does not release to stop the advance movement of the switch wipers.

When relay 303 released at the time wiper 802 engaged the sleeve terminal 837 with relay 539 operated, a circuit was established from ground at the upper back contact of relay 303, over conductor 344, lower front contact of relay 539 to a point between resistance 537 and the condensers associated with the tubes of the chain 450 and since tube 452 was fired to register the units digit 1 and tube 453 was primed, tube 453 now fires extinguishing tube 451. These operations are now repeated to step the wiper set over the terminal sets of the lines of the subgroup 822—823, successive tubes of the chain 400 being fired upon each release of relay 303, when the wiper 802 engages the sleeve terminals of successive lines. When wiper 802 finally engages sleeve terminal 838 of line 823, tube 462 will fire thereby establishing a circuit from anode battery 434 over the inner lower front contact of relay 532, conductor 529, over the anode-cathode gap of tube 462, conductor 540 to battery through the winding of relay 345. Relay 345 upon operating establishes a circuit from ground over its lower contact, conductor 346, the outer right contacts of cross-point contact set 1123, link circuit conductor 946, the outer right contacts of cross-point contact set 935, conductor 947 to battery through the winding of relay 739 of the line-finder connector unit. Relay 739 upon operating locks over its lower No. 1 front contacts to ground on conductor 732.

*Testing the called line for busy or idle condition*

When relay 303 released it also operated relay 320 after which relay 321 operated and relay 320 released as above described. During the time that relay 320 remains operated, the sleeve of the called line is connected to the winding of busy test relay 304 over a circuit which may be traced from battery, 600-ohm resistance 880, sleeve terminal 838, wiper 802, thence as traced to conductor 313, upper front contact of relay 320, upper front contact of relay 345, through the lower normal contacts and winding of relay 304 to ground on conductor 331. If the called line is busy as a calling line, a shunting ground through a 100-ohm resistance, such as 735, will be connected to such line sleeve terminal or if it has been seized as a called line by another connector switch ground through a resistance such as 740 will be connected thereto as hereinafter described and marginal busy test relay 304 will therefore operate, said relay operating whether the line is idle or busy if the line is an individual station line. It will, however, be assumed that the called line is idle and that relay 304, upon operating, locks to battery over its lower alternate contacts; opens at its upper back contact the circuit over which brake magnet 804 was operated to prevent any further movement of the connector switch wipers; connects the circuit previously traced from the sleeve terminal of the called line to conductor 313 thence over its lower front contact, the upper back contact of relay 320, and the inner upper front contact of relay 321 to battery through the winding of busy test relay 347 and at its inner upper back contact breaks the operating circuit of busy test timing relay 348, which was operated thereover, over conductor 349 and the upper front contact of relay 528 when relay 528 operated as previously described. After relay 321 has operated and relay 320 has released, the locking circuit of relay 348 is opened and if the line was idle as assumed and relay 304 operated, relay 348 releases slowly to permit relay 347 to operate if the called line is busy. If as assumed the line is idle, then when relay 348 releases, a circuit is established from ground over the upper back contact of relay 348, upper front contact of relay 304, back contact of relay 347, conductor 350, next to outer left contacts of cross-point contact set 1123, link circuit conductor 948, next to outer left contacts of cross-point contact set 935, conductor 949, winding of cut-through relay 733 to battery. Relay 733 upon operating locks to ground on conductor 732 over its lower No. 1 contact and at its upper No. 4 contacts removes ground from conductor 945 thereby releasing hold magnets 910 and 1110 to release the connection between the line-finder-connector unit and the No. 1 recorder and to remove ground from conductor 1124 thereby releasing recorder hold relay 330 which upon releasing removes ground from conductor 331 to release all operated apparatus of the recorder.

After the recorder has been disconnected from the line-finder-connector unit, the circuit of relay 731 is opened but relay 731 being slow to release does not release before a new operating circuit therefore is established by the operation of calling supervisory relay 839 which operates as soon as cut-through relay 733 operates as previously described. The circuit of relay 839 may be traced from ground through its upper winding over conductor 840, upper No. 1 contacts of relay 739, next to inner lower front contact of relay 721, tip wiper 700, thence as traced over the calling line loop, thence over the ring wiper 701, inner lower front contact of relay 721, upper No. 1 contacts of relay 733, lower No. 2 contacts of relay 739, conductor 841 to battery through the lower winding of relay 839. Relay 733 upon operating also connects ground through resistance 740 over its upper No. 4 contacts, lower No. 2 contacts of relay 733, conductor 834 and wiper 802 to the sleeve terminal 838 of the called line to mark such line as busy to other line finders or connectors and establishes a circuit from ground over its upper No. 2 contacts, the upper No. 2 front contacts of relays 739, conductor 741, next to upper back contact of ringing trip relay 842, to battery through the winding of interrupted ringing start relay 843 and an immediate ringing circuit is established from the ground terminal of ringing generator 844 over the upper back contact of relay 842, conductor 742, upper No. 3 contacts of relays 739 and 733, conductor 743, tip wiper 800, tip terminal of the called line, thence over the called line loop returning over ring wiper 801, conductor 744, lower No. 4 front contacts of relays 733 and 739, conductor 745, lower back contact and lower winding of relay 842, back contact of relay 845 to the other terminal of generator 844.

*Ringing on the called line*

When ringing start relay 843 operates, a circuit is closed from ground over the upper back contact of slow-to-release relay 846 to battery through the winding of slow-to-release relay 847. Relay 847 thereupon operates in turn causing the operation of slow-to-operate relay 848 which after an interval causes the operation of slow-to-release relay 846. Relay 846 upon operating opens the circuit of relay 847 which releases after an interval followed by the release of relays 848 and 846. Thus relay 848 is caused to operate and release at predetermined intervals. On the first operation of relay 848, a circuit is established from gorund over the lower contacts of relay 843, inner lower front contact of relay 848, normal contacts and winding of relay 849, through resistance 850 to battery and relay 849 operates and locks over its alternate contacts to ground at the lower contacts of relay 843. Relay 843 also closes a circuit as traced through the normal contacts of relay 849, through the winding of relay 851, and resistance 852 to battery but the winding of relay 851 is shunted by ground applied to the lower terminal of its winding over its lower back contact as long as relay 848 remains operated. As soon as relay 848 releases, however, relay 851 operates in a circuit from ground over the lower contacts of relay 843, the alternate contacts of relay 849 through the winding of relay 851 and resistance 852 to battery and closes an operating circuit for relay 853 extending from ground over the lower contacts of relay 843, upper front contact of relay 851, normal contacts and winding of relay 853 through resistance 854 to battery and relay 853 operates and locks over its alternate contacts to ground at the lower contacts of relay 843. A circuit in parallel with the winding of relay 853 is also closed through the winding of relay 855 and resistance 856 to battery but so long as relay 851 remains operated, shunting ground is applied to the lower terminal of the winding of relay 855 over the lower back contact thereof and relay 855 does not operate.

On the next operation of relay 843 with relay 851 operated a circuit is closed from ground over the lower contacts of relay 843, the inner lower front contact of relay 848, the lower front contact of relay 851 to a point between resistance 850 and the winding of relay 849 whereupon the winding of relay 849 is shunted and such relay releases. When relay 849 releases, relay 851 is held operated from ground over the lower contacts of relay 843, the inner lower contacts of relay 848, the normal contacts of relay 849, through the winding of relay 851 and resistance 852 to battery, so long as relay 848 remains operated. On the next release of relay 848, relay 851 releases and at its upper front contact opens the shunt around the winding of relay 855 which thereupon operates and closes a circuit for relay 845 which may be traced from ground over the lower contacts of relay 843, and the upper front contact of relay 855 to battery through the winding of relay 845. Relay 845 upon operating locks over its lower front contact and the upper back contact of relay 851 to ground at the lower contacts of relay 843. At its upper front contact relay 845 interrupts the previously traced circuit of ringing generator 844 and substitutes a direct current circuit over the called line loop from battery through ballast resistance 857, the upper front contact of relay 845 and thence as traced back to generator ground.

On the next operation of relay 843, relay 849 operates and locks as previously described followed on the next release of relay 848 by the operation of relay 851, whereupon a circuit is established from ground over the lower contacts of relay 843, over the upper front contact of relay 851, lower front contact of relay 855 to a point between the winding of relay 853 and resistance 854 whereupon the winding of relay 853 being shunted, relay 853 releases. Following the release of relay 853, relay 855 is maintained operated over the normal contacts of relay 853, the upper front contacts of relay 851 to ground over the lower contacts of relay 843 so long as relay 851 remains operated. On the next operation of relay 848, the winding of relay 849 becomes shunted and relay 849 releases whereupon relay 851 is maintained operated over the normal contacts of relay 849 and the inner lower contacts of relay 848 so long as relay 848 remains operated. On the next release of relay 848, relay 851 releases in turn releasing relay 855. Relay 855 upon releasing opens the operating circuit of relay 845.

The above-described cycle of operation of relays 849, 851, 853 and 855 is repeated so long as relay 843 remains operated, the next operation of relay 851 opening the locking circuit of relay 845 which releases to reestablish the ringing circuit and the following operation of relay 855 again causing the operation of relay 845 to open the ringing circuit. Thus relays 845, 846, 847, 848, 849, 851, 853 and 855 function as a ringing interrupter.

The ringing current in addition causes the operation of tube 858 which generates an audible ringing tone. On one half of a cycle of ringing current, the potential applied from ground through generator 844, over the back contact of relay 845, the inner upper front contact of relay 843, across the cathodes of tube 858 and through resistance 859 to ground will be high enough to break down the tube whereby a surge of current will flow over conductor 860, the lower No. 3 contacts of relays 733 and 739, conductor 861, the inner lower back contact of relay 842, condenser 862, condenser 863, conductor 840, thence as traced over the calling line loop and returning over the upper No. 1 contacts of relay 733, the lower No. 2 contacts of relay 733, conductor 841, condenser 864, condenser 890, the upper back contact of relay 842 to generator ground. When the potential on that half cycle is reduced to a point where the tube 858 restores, the tone current ceases. These surges continue as long as ringing current is connected to the tube and inasmuch as they follow the machine ringing period, it gives the effect of an audible ringing tone.

When the called subscriber at station 823 answers, either during a ringing period when relay 845 is unoperated or during a silent interval when relay 845 is operated, relay 842 operates to open the circuit of ringing start relay 843; to open at its outer back contacts the circuit over which ringing current was applied to the called line; to close a locking circuit for itself through its upper winding and inner upper front contact to ground on conductor 732 and to establish a supervisory circuit from ground through the upper winding of called supervisory relay 865, the upper front contact of relay 842, conductor 742, thence as traced over the called line loop returning over conductor 745, the lower front contact of relay 842, to battery through the lower winding of relay 865. Relay 865 thereupon operates and connects ground to conductor 732 whereby relays 733, 739 and 842 are held operated until the called subscriber hangs up. The calling and called supervisory loops are now interconnected by condensers 863 and 864 and the subscribers are enabled to converse with each other.

At the end of the conversation, the restoration of the called subscriber's receiver to its switchhook releases relay 865 and the restoration of the calling subscriber's receiver to its switchhook releases relay 839. The release of relay 839 releases relays 731 and 721 and with relays 731 and 865 both released, ground is removed from conductor 732 whereby relays 733, 739 and 842 release. Upon the release of relay 721, the circuit of brake magnet 704 is closed from battery therethrough, over the next to lower back contact of relay 722, the next to lower back contact of relay 721, the inner lower front contact of relay 720, to ground at the off-normal contacts 703, whereupon the line-finder wiper set is moved in such a direction by the motor 705 as to return it to its normal position. In this case the circuit of the shaded pole windings of the motor 705 extends from the mid-point of the secondary winding of the transformer 727 over contacts of magnet 704, through the shaded pole windings, the upper back contact of relay 722, the next to upper back contact of relay 721, off-normal contacts 703 to the right terminal of the secondary winding of transformer 727. When the wiper set reaches its normal position, the off-normal contacts 703 operate to open the circuit of motor 705, the circuit of brake magnet 704, and the circuit through the lower winding of relay 720.

The release of relays 721 and 733 also closes a circuit from battery through the winding of brake magnet 804, conductor 736, the lower back contact of relay 721, the lower No. 5 back contact of relay 733, the lower front contact of relay 720, conductor 866 to ground over the lower contact of off-normal contacts 803, whereupon magnet 804 operates to close the circuit for motor 805, The circuit for the shaded pole windings thereof extends from the mid-terminal of the secondary winding of the transformer 727, over conductor 737, contacts of magnet 804, shaded pole windings of magnet 805, conductor 738, upper back contact of relay 721, conductor 867, off-normal contacts 803, conductor 311 to the right terminal of the secondary winding of the transformer 727. When the connector wiper set reaches its normal position, the off-normal contacts 803 open the circuit of motor 805, the circuit of magnet 804 and the circuit through the upper winding of relay 720. Relay 720 now releases. All apparatus used in the establishment of the connection is now in normal condition.

*Called line busy*

It will now be assumed that when the busy test relay 304 was connected to the sleeve terminal 838 of the called line 823, the line was busy but that since the line is an individual line, busy test relay 304 operated and that therefore when relay 348 released, busy test relay 347 operated in a circuit from ground through a low resistance such as 735 or 740 connected to the sleeve terminal 838 by either a line finder or a connector which has seized such line, sleeve wiper 802 and thence as traced to conductor 313, lower contacts of relay 304, upper back contact of relay 320, inner upper front contact of relay 321 through the winding of relay 347 to battery. Thereafter when busy test timing relay 348 releases, a circuit is established from ground over its back contact, the upper front contact of relay 304, the front contact of relay 347, conductor 351 to battery through the winding of relay 541. Relay 541 thereupon operates, locks over its inner left front contact to ground on conductor 331, and establishes a circuit from ground over its right front contact, conductor 542 to battery through the winding of busy-back relay 868. Relay 868 upon operating, closes a circuit from ground over its inner upper front contact, over the back contact of relay 846 for operating relay 847 whereby the cycling of relays 846, 847 and 848 is started, and closes a circuit over its upper front contact for interrupter relay 826. The intermittent operation of relay 826 generates a tone current which upon each operation of relay 848 is transmitted from ground through the lower winding of relay 826, lower contacts of relay 848, lower contacts of relay 868, conductor 543 through condenser 544, outer left front contact of relay 541, outer left front contact of relay 503, conductor 525, outer left contacts of cross-point contact set 1123, link circuit conductor 942, outer left contacts of cross-point contact set 935, conductor 941, inner upper normal contacts of relay 733, inner lower front contacts of relay 721, thence over the calling line loop as traced, returning over the next to inner lower front contact of relay 721 to ground at the upper No. 5 back contact of relay 733. The calling subscriber thus receives a busy tone signal interrupted at intervals by relay 848. Upon hearing the busy tone signal, the calling subscriber will restore his receiver to the switchhook whereupon all operated apparatus will be restored in the manner previously described.

*Trunk call*

A call is established to a tie-line trunk, to a central office trunk or to an attendant's trunk in the same manner except that as previously stated one of the hundreds register relays 489, 490, 491 or 492 will be operated following which relays 494, 528 and 532 will be operated without waiting for the receipt of additional series of impulses. Relay 310 will not be operated in this case and therefore when relay 532 operates, the motor 805 of the connector will be operated in such a direction as to drive the wiper set thereof upwardly. It will be assumed that the calling subscriber has dialed the hundreds digit 0, to establish a connection to the attendant's station and that therefore register relay 492 has been operated and as previously stated has caused the firing of tube 401 in the chain 400. As a consequence, when the test wiper 802 of the connector switch passes over sleeve terminals of the group terminal sets, tubes 402 to 415, inclusive, of the chain will be successively fired, at which time the wiper set will have been moved into engagement with the group terminal set allocated to the group of trunks extending to the attendant's position. In the manner previously described the wiper set will be centered on this group terminal set and thereafter advanced to the terminal set 816 of the first trunk of the group extending to the attendant's position in the manner previously described. When this terminal set has been reached, relay 303 releases as previously described and establishes a circuit from ground on conductor 331 over the inner upper back contact of relay 303, conductor 352, inner upper back contact of relay 523, conductor 356, upper front contact of hundreds register relay 492, conductor 353, to battery through the winding of relay 324 which thereupon operates and locks over its lower contact to ground on conductor 331.

When relay 303 releases, it also causes the operation of relay 320 followed by the operation of relay 321 and the release of relay 320 whereby as previously described, during the time that relay 320 remains operated, the connector test wiper 802 is connected over conductor 313, the inner upper front contact of relay 320 and the upper front contact of relay 324, through the normal contacts and winding of busy test relay 304 to ground on conductor 331. The sleeve terminal of the first and intermediate trunks of the trunk group are each connected through a high resistance of approximately 2400 ohms to negative battery and the sleeve terminal of the last trunk of the group is connected through a low resistance of approximately 600 ohms to negative battery. If the first trunk 820 is busy, sleeve terminal 869 thereof will be connected through high resistance 870, to negative battery and will be connected to ground through a 100-ohm resistance such as 740 applied thereto by another connector. In that case marginal relay 304 will not operate and when relay 320 releases with relay 321 operated, the circuit of brake magnet 804 will be reclosed over the upper back contact of relay 304 and thence as previously traced and the connector wiper set will be advanced to the next trunk terminal set whereupon relay 304 will again be connected to the test wiper 802. These operations will continue until an idle trunk terminal set is reached when relay 304 will operate. Relay 304 will also operate when the last trunk terminal set 817 of the group is reached regardless of whether the last trunk of the group is busy or idle. When relay 304 operates, it opens at its upper back contact the circuit of brake magnet 804 to arrest any further movement of the connector wiper set and proceeds as previously described to connect test relay 347 to the test wiper. If the trunk is busy, the busy tone current is applied to the calling line as previously described through the operation of relays 347, 541 and 868 and if idle the cut-through relay 733 is operated but relay 739 will not be operated at this time. It will be assumed that a connection is established with the last trunk 821 of the group and that this trunk is idle.

A circuit is now established from battery through the winding of relay 731, the upper No. 4 back contact of relay 739, the lower No. 2 front contact of relay 733, conductor 834, sleeve wiper 802 to the sleeve terminal 871 of trunk 821. A circuit is also established from ground through the lower winding of trunk line relay 872, over the lower back contact of cut-off relay 873, tip terminal 874, tip wiper 800, conductor 743, the upper No. 3 front contact of relay 733, the upper No. 3 back contact of relay 739, thence as traced over the calling line loop returning over the upper No. 1 front contact of relay 733, the lower No. 4 back contact of relay 739, the lower No. 4 front contact of relay 733, conductor 744, ring wiper 802 and ring terminal 875, upper back contact of cut-off relay 873 to battery through the upper winding of relay 872. Relay 872 thereupon operates closing an obvious circuit to light lamp 876 and closing an obvious circuit for slow-to-release relay 877 which upon operating connects ground through 100-ohm resistance 878 to sleeve terminal 871 to mark the called trunk as busy. This ground connection also serves to hold relay 731 operated over the circuit previously traced, following the disconnection of the recorder circuit after relay 733 operated as previously described.

When the attendant answers the call by plugging a cord plug into jack 879, cut-off relay 873 is operated by the closure of the upper contacts of jack 879 thereby disconnecting the windings of line relay 872 which thereupon releases to extinguish the lamp 876, establishes a new circuit to hold relay 877 operated following the release of relay 872 and connects ground over the sleeve of jack 879 to the attendant's cord circuit. The calling subscriber is now provided with talking battery from the cord circuit. When the attendant disconnects from the jack 879 and the calling subscriber hangs up, relay 877 releases in turn releasing relay 731, 733 and 721 whereupon the line finder and connector are returned to their normal positions as previously described.

*Recorder timed out*

A common timing circuit is provided to free recorders which become stuck because of a permanent signal condition. As soon as relay 330 operates preparatory to the transmission of dialing tone to the calling subscriber's line, a circuit is closed from ground over the back contact of relay 497, the back contact of relay 498, conductor 354, middle upper front contact of relay 330, conductor 355, through the normal contacts and winding of relay 499 to battery. If relays 497 and 498, which are common to all recorder circuits, are not at the time operated because of a timing operation initiated by another recorder, relay 499 will thereupon operate, lock over its lower normal contacts to ground on conductor 331, and start a timing operation by closing the circuit of start relay 498. Relay 498 which is slow to operate, operates after an interval opening at its upper back contact, the initial operating circuit for relay 499, locking over its upper front contact and the back contact of relay 497 to ground and establishing a circuit for slow-to-operate relay 496. After a further interval, relay 496 operates closing an obvious circuit for relay 497 which operates to open the locking circuit of relay 498 and if the permanent signal condition still persists to close a circuit from ground over its upper contact, the upper contact of relay 499, the next to upper back contact of relay 494, to battery through the winding of permanent signal register relay 493 which operates in turn closing a circuit over its inner lower front contact through the winding of relay 495 if relay 494 has not operated because the first digit has not been dialed and registered. If relay 494 has operated, the operation of relay 497 with relay 499 operated, establishes a circuit over the upper front contact of relay 494 to battery through the winding of relay 495.

If both relays 493 and 495 are operated, the control circuits which would have been closed by the operation of relays 492, 494 and 532, following the dialing a hundreds digit 0, will be closed whereby the call will be routed to the attendant's position in the manner previously described.

If relay 495 operates alone, it disconnects ground from the circuit previously traced to battery through the winding of relay 721 of the linefinder connector unit whereby the connection is released as though the call had been abandoned.

What is claimed is:

1. In a telephone exchange system, a motor-driven selector switch having access to the terminals of a plurality of lines, each of said lines terminating in tip, ring and sleeve terminals in a bank of said switch, an electronic relay, means for rendering said relay conducting upon the seizure of said switch for use, means for operating the motor of said switch to advance the wipers of said switch over the terminals of said lines, means responsive to the engagement of the sleeve wiper of said switch with the sleeve terminals of successive lines to repeatedly render said relay non-conducting, and means controlled by said relay upon each engagement of the sleeve wiper with a sleeve terminal to momentarily stop said motor whereby the wipers of said switch are advanced step by step over the terminals of said lines.

2. In a telephone exchange system, a motor-driven line finder having access to the terminals of a plurality of lines, each of said lines terminating in tip, ring and sleeve terminals in a bank of said line finder, an electronic relay, means for rendering said relay conducting upon the seizure of said line finder for use, means for operating the motor of said line finder to advance the wipers of said line finder over the terminals of said lines, means responsive to the engagement of the sleeve wiper of said line finder with the sleeve terminals of successive lines to repeatedly render said relay non-conducting, means controlled by said relay upon each engagement of the sleeve wiper with a sleeve terminal to momentarily stop said motor, whereby the wipers of said line finder are advanced step by step over the terminals of said lines, a second electronic relay, means for rendering said second electronic relay conducting upon the engagement of the tip wiper of said line finder with the tip terminal of a line that is in a calling condition, and means controlled by said second relay for stopping said motor with the wipers of said line finder in engagement with the terminals of said calling line.

3. In a telephone exchange system, a motor-driven connector switch having access to the terminals of a plurality of lines, each of said lines terminating in tip, ring and sleeve terminals of a bank of said switch, an electronic relay, means for rendering said relay conducting upon the seizure of said switch for use, means for operating the motor of said switch to advance the wipers of said switch over the terminals of said lines, means responsive to the engagement of the sleeve wiper of said switch with the sleeve terminals of successive lines to repeatedly render said relay non-conducting, means controlled by said relay upon each engagement of the sleeve wiper with a sleeve terminal to momentarily stop said motor, whereby the wipers of said switch are advanced step by step over the terminals of said lines, a digit registering means and means jointly controlled by said registering means and said electronic relay controlled means for stopping said motor to position the wipers of said switch on the terminals of the line identified by said digit registering means.

4. In a telephone exchange system, a motor-driven connector switch having access to the terminals of a plurality of lines, each of said lines terminating in tip, ring and sleeve terminals of a bank of said switch, an electronic relay, means for rendering said relay conducting upon the seizure of said switch for use, means for operating the motor of said switch to advance the wipers of said switch over the terminals of said lines, means responsive to the engagement of the sleeve wiper of said switch with the sleeve terminals of successive lines to repeatedly render said relay non-conducting, means controlled by said relay upon each engagement of the sleeve wiper with a sleeve terminal to momentarily stop said motor, whereby the wipers of said switch are advanced step by step over the terminals of said lines, a chain of cold cathode tubes, means for selectively firing one of said tubes in response to a dialed digit, means controlled by said relay when repeatedly rendered non-conducting for successively firing the remaining tubes of said chain subsequent to said selectively fired tube, and means responsive to the firing of the last tube of said chain for stopping said motor to position the wipers of said switch on the terminals of the line identified by said dialed digit.

5. In a telephone exchange system, a motor-driven switch having access to the terminals of a plurality of lines, said lines being divided into subgroups and each terminating in a set of terminals in a bank of said switch, a set of group terminals in said bank preceding each subgroup of line terminals, a chain of cold cathode tubes, means for selectively firing one of said tubes to identify a subgroup of lines, means for operating the motor of said switch to advance the wipers of said switch in a line group selecting movement, means responsive to the engagement of said wipers with successive sets of group terminals for successively firing the remaining tubes of said chain subsequent to said selectively fired tube, and means responsive to the firing of the last tube of said chain for controlling said motor to center said wipers on the set of group terminals identified by said selectively fired tube.

6. In a telephone exchange system, a motor-driven switch having access to the terminals of a plurality of lines, said lines being divided into subgroups and each line terminating in a set of terminals in a bank of said switch, a set of group terminals in said bank preceding each subgroup of line terminals, a chain of cold cathode tubes, said tubes being so arranged that any tube upon being fired extinguishes the next preceding tube and primes the next succeeding tube, means for selectively firing one of said tubes to identify a subgroup of lines, means for operating the motor of said switch at a high speed to advance the wipers of said switch in a group selecting movement, means responsive to the engagement of said wipers with successive group terminals for successively firing the remaining tubes of said chain subsequent to said selectively fired tube, means controlled by the firing of the last tube of said chain for arresting the selecting movement of said wipers, means for thereafter operating said motor in a reverse direction at a slower speed to return said wipers to the group terminal last encountered whereby, upon the reengagement of said wiper with said group terminal, a tube preceding said last tube is fired and said last tube is extinguished, and means controlled by the extinguishing of said last tube for bringing said wipers to rest on the identified group terminal.

7. In a telephone exchange system, a motor-driven connector switch having access to the terminals of a plurality of lines, said lines being divided into subgroups and each line terminating in a set of terminals in a bank of said switch, a set of group terminals in said bank preceding each subgroup of line terminals, a chain of cold cathode tubes, said tubes being so arranged that any tube upon being fired extinguishes the next preceding tube and primes the next succeeding tube, means responsive to a dialed digit for selectively firing one of said tubes to identify a desired subgroup of lines, means for operating the motor of said switch at a high speed to advance the wipers of said switch in a group selecting movement, means responsive to the engagement of said wipers with successive group terminals for successively firing the remaining tubes of said chain subsequent to said selectively fired tube, means controlled by the firing of the last tube of said chain for arresting the selecting movement of said wipers, means for thereafter operating said motor in the reverse direction at a slower speed to return said wipers to the group terminal last encountered whereby upon the reengagement of said wiper with said group terminal, a tube preceding said last tube is fired and said last tube is extinguished, and means controlled by the extinguishing of said last tube for bringing said wipers to rest on the group terminal identified by said dialed digit.

8. In a telephone exchange system, a motor-driven line finder having access to the terminals of a plurality of lines, said lines being divided into subgroups and each terminating in a set of terminals in the bank of said line finder, a set of group terminals in said bank preceding each subgroup of line terminals, a line-group relay for each subgroup of lines operable upon the initiation of a call from any line of its subgroup, a chain of cold cathode tubes, means for selectively firing one of said tubes in response to the operation of one of said relays to identify the subgroup in which the calling line is located, means for operating the motor of said line finder to advance the wipers thereof in a line group selecting movement, means responsive to the engagement of said wipers with successive sets of group terminals for successively firing the remaining tubes of said chain subsequent to said selectively fired tube, and means responsive to the firing of the last tube of said chain for controlling said motor to center said wipers on the set of group terminals identified by said operated line group relay.

9. In a telephone exchange system, a motor-driven line finder having access to the terminals of a plurality of lines, said lines being divided into subgroups and each terminating in a set of terminals in a bank of said line finder, a set of group terminals in said bank preceding each subgroup of line terminals, a chain of cold cathode tubes, means for selectively firing one of said tubes to identify a subgroup of lines, an electronic relay, means for rendering said relay conducting upon the seizure of said line finder for use, means for operating the motor of said line finder at high speed to advance the wipers thereof in a line-group selecting movement, means responsive to the engagement of said wipers with successive sets of group terminals for successively firing the remaining tubes of said chain subsequent to said selectively fired tube, means responsive to the firing of the last tube of said chain for operating said motor at a lower speed to advance the wipers of said line finder over the terminals of the lines of the selected subgroup, means responsive to the engagement of the wipers with terminals of the successive lines to repeatedly render said relay non-conducting, means controlled by said relay each time it is thus rendered non-conducting to momentarily stop said motor, whereby the wipers of said line finder are advanced step by step over the terminals of said lines, a second electronic relay, means for rendering said second relay conducting upon the engagement of said wipers with the terminals of a line that is in a calling condition, and means controlled by said second relay for stopping said motor with the wipers of said line finder in engagement with the terminals of said calling line.

10. In a telephone exchange system, a motor-driven line finder having access to terminals of a plurality of lines, certain of said lines terminating in the terminals of a bank above and others of said lines terminating in the terminals of a bank below the normal position of the wipers of said line finder, said lines being divided into subgroups, a set of group terminals in said banks preceding each subgroup of line terminals, a line-group relay for each subgroup of lines operable upon the initiation of a call from any line of its subgroup, means responsive to the operation of one of said relays for indicating whether the calling line terminates in the upper or in the lower bank of said line finder, a chain of cold cathode tubes, means for selectively firing one of said tubes in response to the operation of one of said relays for identifying the subgroup of terminals of the bank in which the calling line terminates, means for operating the motor of said line finder to advance the wipers thereof either upwardly or downwardly as determined by said bank indicating means in a line-group selecting movement, means responsive to the engagement of said wipers with successive sets of group terminals for successively firing the remaining tubes of said chain subsequent to said selectively fired tube, and means responsive to the firing of the last tube of said chain for controlling said motor to center said wipers on the set of group terminals identified by said operated line group relay.

11. In a telephone exchange system, a motor-driven connector switch having access to the terminals of a plurality of lines, certain of said lines terminating in the terminals of a bank above and others of said lines terminating in the terminals of a bank below the normal position of the wipers of said switch, said lines being divided into subgroups, a set of group terminals in said bank preceding each subgroup of line terminals, a first chain of cold cathode tubes, means for successively firing tubes of said chain in response to the impulses of the hundreds digit of a dialed wanted line number, register relays selectively operable in accordance with the last tube fired in response to said impulses, means responsive to the operation of one of said relays for indicating whether the wanted line terminates in the upper or in the lower bank of said switch, a second chain of cold cathode tubes, means controlled by said operated register for selectively firing a tube of said second chain, means for operating the motor of said switch to advance the wipers thereof either upwardly or downwardly as determined by said bank indicating means in a group selecting movement, means responsive to the engagement of said wipers with successive group terminals for successively firing the remaining tubes of said second chain, and means controlled by the firing of the last tube of said second chain for arresting the selecting movement of said wipers.

12. In a telephone exchange system, a motor-driven connector switch having access to the terminals of a plurality of lines, certain of said lines terminating in the terminals of a bank above and others of said lines terminating in terminals of a bank below the normal position of the wipers of said switch, said lines being divided into subgroups, a set of group terminals in said bank preceding each subgroup of line terminals, a first chain of cold cathode tubes, means for successively firing tubes of said chain in response to the impulses of the hundreds digit of a dialed wanted line number, register relays selectively operable in accordance with the last tube fired in response to said impulses, means responsive to the operation of one of said relays for indicating whether the wanted line terminates in the upper or in the lower bank of said switch, a second chain of cold cathode tubes, means controlled by said operated register relay for extinguishing the fired tube of said first chain and for firing a tube of said second chain to indicate that the wanted line terminates in one of the first ten subgroups of a bank, means responsive to the impulses of a dialed tens digit of a wanted line number for successively firing subsequent tubes of said second chain, means responsive to the impulses of a dialed units digit of a wanted line number for successively firing tubes of said first chain, means for operating the motor of said switch at a high speed to advance the wipers thereof either upwardly or downwardly as determined by said bank indicating means in a group selecting movement, means responsive to the engagement of said wipers with successive group terminals for successively firing the remaining tubes of said second chain, means controlled by the firing of the last tube of said second chain for arresting the group selecting movement of said wipers and for then causing said wipers to advance step by step over the terminals of said selected group, said wipers upon engaging with successive terminals of said group causing the successive firing of the remaining tubes of said first chain, and means responsive to the firing of the last tube of said first chain for arresting said wipers upon the terminals of said wanted line.

13. In a telephone exchange system, a motor-driven connector switch having access to the terminals of a plurality of station lines and to the terminals of trunks, said lines and trunks being divided into subgroups, a set of group terminals in the bank of said switch preceding each subgroup of line or trunk terminals, a first chain of cold cathode tubes, means for successively firing tubes of said chain in response to the impulses of the hundreds digit of a wanted line or trunk number, register relays selectively operable in accordance with the last tube fired in response to said impulses, a second chain of cold cathode tubes, means controlled by said operated register relay for extinguishing the fired tube of said first chain and for selectively firing a tube of said second chain to indicate that the wanted line is located in one of the first ten subgroups if the hundreds digit of a station line is dialed and to indicate a particular subgroup above ten if the hundreds digit of a trunk number is dialed, means responsive to said operated register relay if a trunk number is dialed for immediately operating the motor of said switch at a high speed to advance the wipers thereof in a group selecting movement, means responsive to the engagement of said wipers with successive group terminals for successively firing the remaining tubes of said second chain, means controlled by the firing of the last tube of said second chain for arresting the group selecting movement of said wipers and for then causing said wipers to advance step by step over the terminals of said group in search of an idle trunk and means for arresting the hunting movement of said switch when said wipers engage the terminals of an idle trunk.

14. In a telephone exchange system, a plurality of station lines and trunks divided into a plurality of subgroups, a plurality of line-finder-connector switch units for establishing connections between said lines and trunks, a plurality of recorders for controlling said switch units, means controlled by the initiation of a call from a station line or trunk of any subgroup for seizing an idle recorder, said recorders being seizable in a different order of preference by different subgroups of lines and trunks, a plurality of link circuits for associating any one of said recorders with an idle one of said units, means operative upon the seizure of an idle recorder for seizing an idle link circuit, said link circuit being seizable in a different order of preference by different ones of said recorders, and means operable upon the seizure of an idle recorder for seizing an idle unit, each of said link circuits having access to a different plurality of said units.

15. In a telephone exchange system, a plurality of station lines and trunks divided into a plurality of subgroups, a plurality of line-finder-connector switch units divided into a plurality of groups for establishing connections between said lines and trunks, a plurality of recorders for controlling said switch units, means controlled by the initiation of a call, from a station line or trunk of any subgroup for seizing an idle recorder, said recorders being seizable in a different order of preference by different subgroups of lines and trunks, a plurality of link circuits for associating any one of said recorders with an idle one of said units, a cross-bar switch for connecting said recorders to said link circuits, said switch having select magnets individual respectively to said recorders and hold magnets individual respectively to said link circuits, a crossbar switch for connecting any link circuit to an idle unit, said latter switch having as many select magnets as there are units in each group of units and each select magnet being common to the corresponding unit of each group and hold magnets individual respectively to said link circuits, means responsive to the seizure of an idle recorder for operating the select magnets of said switches corresponding to said recorder and to an idle unit accessible over the first idle link circuit which is the preference for said recorder, and means responsive to the operation of said select magnets and to the seizure of said idle unit for operating the hold magnets of said switches corresponding to said idle link circuit for completing a connection between said recorder and said unit.

16. In a telephone exchange system, a selector switch, the wipers of which have access to a plurality of terminals, means for advancing said wipers over said terminals, a chain of cold cathode tubes, said tubes being so arranged that any tube upon being fired extinguishes the next preceding tube and primes the next succeeding tube, means for initially firing one tube of said chain and a relay operable upon the engagement of said wipers with successive terminals for causing the successive firing of tubes of said chain subsequent to said initially fired tube to count the number of terminals over which said wipers have advanced.

PHYLLIS RAYMOND,
*Administratrix of the Estate of Ralph Raymond, Deceased.*